US011308152B2

(12) United States Patent
Huang et al.

(10) Patent No.: US 11,308,152 B2
(45) Date of Patent: Apr. 19, 2022

(54) QUANTIZATION METHOD FOR FEATURE VECTOR, SEARCH METHOD, APPARATUS AND STORAGE MEDIUM

(71) Applicant: CANON KABUSHIKI KAISHA, Tokyo (JP)

(72) Inventors: Yaohai Huang, Beijing (CN); Cheng Tan, Beijing (CN); Yuanda Deng, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 16/431,520

(22) Filed: Jun. 4, 2019

(65) Prior Publication Data
US 2019/0377751 A1 Dec. 12, 2019

(30) Foreign Application Priority Data

Jun. 7, 2018 (CN) .......................... 201810581919.2
Feb. 20, 2019 (CN) .......................... 201910126323.8

(51) Int. Cl.
*G06F 7/00* (2006.01)
*G06F 16/56* (2019.01)
*G06F 16/53* (2019.01)

(52) U.S. Cl.
CPC .............. *G06F 16/56* (2019.01); *G06F 16/53* (2019.01)

(58) Field of Classification Search
CPC ...... G06F 16/56; G06F 16/53; G06F 16/3347; G06F 17/16
See application file for complete search history.

(56) References Cited

U.S. PATENT DOCUMENTS 4,907,276 A * 3/1990 Aldersberg .......... G06K 9/6272
704/203
4,933,956 A * 6/1990 Forney, Jr. ........ H03M 13/1505
375/285

(Continued)

FOREIGN PATENT DOCUMENTS

EP 3115908 A1 1/2017
EP 3115909 A1 1/2017

OTHER PUBLICATIONS

Fast Planner-Oriented Ripple Search Algorithm for Hyperspace VQ Codebook, Chin-Chen Chang, Fellow, IEEE, and Wen-Chuan Wu, Feb. 5, 2006 (Year: 2006).*

(Continued)

*Primary Examiner* — Mohammed R Uddin
(74) *Attorney, Agent, or Firm* — Canon U.S.A., Inc. IP Division

(57) ABSTRACT

Embodiments of the present disclosure provide a quantization method of feature vector, search method, apparatus and storage medium, wherein the quantization method comprises: setting quantization codewords; selecting, from the set quantization codewords, at least one quantization codeword of which distance from an original feature vector is smaller than first predetermined distance as a quantization codeword subset; determining quantization feature vectors corresponding to the original feature vector by using at least two quantization codewords, wherein at least one quantization codeword from the at least two quantization codewords are in the quantization codeword subset. The search method is a method of performing a search among quantization feature vectors after a quantization using the quantization method.

19 Claims, 18 Drawing Sheets

(56) References Cited

U.S. PATENT DOCUMENTS

| | | | | |
|---|---|---|---|---|
| 4,958,225 | A * | 9/1990 | Bi | G06T 9/008 341/106 |
| 4,963,030 | A * | 10/1990 | Makur | G06T 9/008 375/240 |
| 5,250,949 | A * | 10/1993 | Frost | H03M 7/3082 341/200 |
| 5,297,170 | A * | 3/1994 | Eyuboglu | H03M 7/3082 375/241 |
| 5,444,800 | A * | 8/1995 | Kim | G06T 9/008 375/240.22 |
| 5,477,221 | A * | 12/1995 | Chang | G06T 9/008 341/51 |
| 5,596,659 | A * | 1/1997 | Normile | G06T 9/008 348/422.1 |
| 5,668,925 | A * | 9/1997 | Rothweiler | G10L 19/06 704/220 |
| 6,035,057 | A * | 3/2000 | Hoffman | G01S 7/12 382/159 |
| 6,233,017 | B1 * | 5/2001 | Chaddha | H04N 21/234327 348/412.1 |
| 6,392,705 | B1 * | 5/2002 | Chaddha | G06T 9/40 348/388.1 |
| 6,826,524 | B1 * | 11/2004 | Kim | G06T 9/008 704/200 |
| 6,952,671 | B1 * | 10/2005 | Kolesnik | G10L 19/07 704/222 |
| 7,602,745 | B2 * | 10/2009 | Lin | H04B 7/0617 370/203 |
| 8,175,375 | B2 * | 5/2012 | Bonnery | H04N 19/12 382/155 |
| 8,285,063 | B2 * | 10/2012 | Akenine-Moller | G06T 9/008 382/243 |
| 8,731,317 | B2 * | 5/2014 | Sanchez | G06K 9/4676 382/253 |
| 8,880,415 | B1 * | 11/2014 | Eck | G10L 25/27 704/503 |
| 2002/0038210 | A1 * | 3/2002 | Yajima | G10L 19/06 704/230 |
| 2004/0102972 | A1 * | 5/2004 | Droppo | G10L 19/038 704/242 |
| 2007/0201558 | A1 * | 8/2007 | Xu | G06K 9/6218 375/240.22 |
| 2009/0003660 | A1 * | 1/2009 | Das | G06K 9/6223 382/118 |
| 2009/0003692 | A1 * | 1/2009 | Pettersson | G06T 9/005 382/166 |
| 2009/0019334 | A1 * | 1/2009 | Tomlinson | H03M 13/03 714/755 |
| 2009/0034805 | A1 * | 2/2009 | Perlmutter | G06F 16/5838 382/118 |
| 2010/0014766 | A1 * | 1/2010 | Akenine-Moller | H04N 19/176 382/239 |
| 2010/0174539 | A1 * | 7/2010 | Nandhimandalam | G10L 19/038 704/222 |
| 2012/0039416 | A1 * | 2/2012 | Tang | H04L 25/03923 375/296 |
| 2014/0233848 | A1 * | 8/2014 | Han | G06K 9/00201 382/154 |
| 2014/0247972 | A1 * | 9/2014 | Wang | G06K 9/0014 382/133 |
| 2014/0270541 | A1 * | 9/2014 | Lee | G06K 9/4676 382/201 |
| 2015/0104110 | A1 * | 4/2015 | Balestri | G06T 9/00 382/251 |
| 2015/0206026 | A1 * | 7/2015 | Kim | G06K 9/00335 382/170 |
| 2015/0280800 | A1 * | 10/2015 | Chen | H04B 7/0619 375/267 |
| 2016/0358039 | A1 * | 12/2016 | Ko | G06K 9/4647 |
| 2017/0024614 | A1 * | 1/2017 | Sanil | G06F 16/70 |
| 2017/0103264 | A1 * | 4/2017 | Javan Roshtkhari | G06K 9/6215 |
| 2018/0089534 | A1 * | 3/2018 | Ye | G06K 9/2018 |
| 2019/0236167 | A1 * | 8/2019 | Hu | G06K 9/6274 |
| 2020/0183964 | A1 * | 6/2020 | Wu | G06F 16/3347 |
| 2020/0226137 | A1 * | 7/2020 | Zhao | G06F 16/2237 |
| 2020/0311077 | A1 * | 10/2020 | Zhang | G06F 3/0644 |

OTHER PUBLICATIONS

Wieschollek et al.; Efficient Large-scale Approximate Nearest Neighbor Search on the GPU; 2016 IEEE Conference on Computer Vision and Pattern Recognition; Jun. 2016; pp. 2027-2035.

* cited by examiner

| QUANTIZATION ERROR OF LQ TECHNIQUE (20,000 CONNECTION LINES) | QUANTIZATION ERROR OF PRESENT APPLICATION (20,000 CONNECTION LINES) |
|---|---|
| 0.0222142 | 0.0228535 |
| 0.0228535 | 0.0228715 |
| 0.0228715 | 0.0239911 |
| 0.0234349 | 0.0241910 |
| ...... | ... |
| 9.9110213 | 1.9480330 |
| 9.9144505 | 1.9731827 |

SORTING IN ORDER OF DISTANCES FROM NEAR TO FAR FROM ORIGINAL FEATURE VECTOR

US 11,308,152 B2

QUANTIZATION METHOD FOR FEATURE VECTOR, SEARCH METHOD, APPARATUS AND STORAGE MEDIUM

CROSS-REFERENCE TO RELATED APPLICATIONS

This application claims the benefit of Chinese Patent Application No. 201810581919.2, filed Jun. 7, 2018, and this application claims the benefit of Chinese Patent Application No. 201910126323.8, filed Feb. 20, 2019, both of which are hereby incorporated by reference herein in their entirety.

BACKGROUND

Field of the Disclosure

The present disclosure relates to a method for improving quantization speed of a feature vector, and a search method for quantization feature vectors, apparatuses and storage mediums.

Description of the Related Art

A search technique for human body images is a search technique based on human body feature matching, needs to index feature vectors indicating key information of human features in a built database, and obtains a search result based on a similarity degree between a feature vector to be looked up and a feature vector stored in the database when a search is performed. In general, the number of the feature vectors stored in the database is very large, and a quantization processing may be performed on original feature vectors by using a feature quantization technique in order to reduce storage spaces occupied by a large number of feature vectors. Compared with the original feature vectors before quantization, the feature vectors after quantization become shorter in length and occupy the less storage spaces, and thus it is possible to effectively save storage spaces in a large-scale search system. In addition, since the feature vectors after quantization reduce in length, the search speed may be enhanced in performing a human body image search. Therefore, it is very important to use a feature quantization technique with high performance to enhance a property of the large-scale search system.

A known feature quantization technique is a Line Quantization (LQ) technique, which is mentioned in a paper of 《Efficient Large-scale Approximate Nearest Neighbor Search on the GPU》 published in IEEE Conference on Computer Vision and Pattern Recognition (CVPR). LQ technique is a technique which sets quantization codewords in a feature space and performs quantization on an original feature vector by using connection lines between the quantization codewords.

With the above LQ technique, quantization feature vectors with shorter length and less occupied storage space may be obtained by quantization; however, in the LQ technique, in order to find the connection line of which the projection distance is the shortest from the original feature vector, it is required to go throughout all quantization codewords, and it is also required to calculate distances between the original feature vector and the connection lines between any two quantization codewords, which will result in that computation amount is extremely huge and time required in performing the quantization process is very long. Especially, when more quantization codewords are set in order to improve quantization accuracy, the quantization process will occupy more computation resources and cost longer operation time.

SUMMARY

Embodiments of the present disclosure provide a quantization technique for feature vectors and a search technique based on feature vectors after quantization so as to reduce computation resources occupied by the quantization process and shorten quantization time.

Some embodiments of the present disclosure include a quantization method comprising: setting quantization codewords; selecting, from the set quantization codewords, at least one quantization codeword of which distance from an original feature vector is smaller than first predetermined distance as a quantization codeword subset; and determining quantization feature vectors corresponding to the original feature vector by using at least two quantization codewords, wherein at least one quantization codeword from the at least two quantization codewords are in the quantization codeword subset.

Some embodiments of the present disclosure include a search method comprising: calculating distances of a feature vector to be looked up from quantization feature vectors after a quantization using the above quantization method in a database; and determining, as a search result, at least one quantization feature vector for which distances satisfy a condition.

Some embodiments of the present disclosure include a quantization apparatus comprising: a setting unit, configured to set quantization codewords; a selecting unit, configured to select, from the set quantization codewords, at least one quantization codeword of which a distance from an original feature vector is smaller than first predetermined distance as a quantization codeword subset; and a quantization unit, configured to determine a quantization feature vector corresponding to the original feature vector by using at least two quantization codewords, wherein at least one quantization codeword from the at least two quantization codewords are in the quantization codeword subset.

Some embodiments of the present disclosure include a search apparatus comprising: a calculating unit, configured to calculate distances of a feature vector to be looked up from quantization feature vectors after a quantization using the above quantization apparatus, which are stored in a database; and a determining unit, configured to determine, as a search result, at least one quantization feature vector for which distances satisfy a condition.

Some embodiments of the present disclosure include a non-transitory computer-readable storage medium storing instructions for causing a computer to perform a quantization method when executed by computer, the quantization method comprising: setting quantization codewords; selecting, from the set quantization codewords, at least one quantization codeword of which distance from an original feature vector is smaller than first predetermined distance as a quantization codeword subset; and determining quantization feature vectors corresponding to the original feature vector by using at least two quantization codewords, wherein at least one quantization codeword from the at least two quantization codewords are in the quantization codeword subsets.

Some embodiments of the present disclosure include a non-transitory computer-readable storage medium storing instructions for causing a computer to perform a search method when executed by the computer, the search method comprising: calculating distances of a feature vector to be looked up from quantization feature vectors after a quantization using the above quantization method in a database; and determining, as a search result, at least one quantization feature vector for which distances satisfy a condition.

Further features of the present disclosure will become clear from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description of the embodiments, serve to explain the principles of the present disclosure.

DESCRIPTION OF THE EMBODIMENTS

Figure 1:
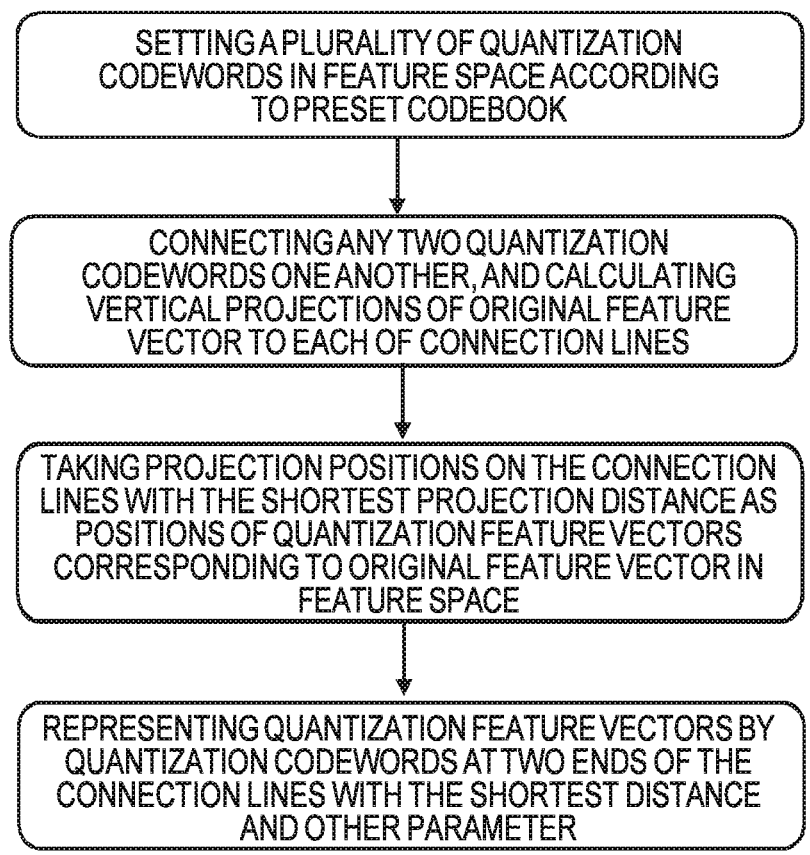
FIG. 1 is a flow schematic diagram of a LQ technique.

Exemplary embodiments of the present disclosure will be described below with reference to the drawings. For the purpose of clearness and conciseness, not all features of the embodiments are described in the specifications. However, it shall be understood that many settings specific to implementation manners shall be made during the implementation of the embodiments, so as to achieve the specific objects of developers, for example conform to the limitation conditions related with devices and businesses, and these limitation conditions may vary depending on difference of the implementation manners. Moreover, it shall be also understood that, development works are only routine tasks for persons skilled in the art who benefit from the contents of this disclosure, although the development works may be very complicated and time-consuming.

Herein, it shall be also noted that, for clarity, processing steps and/or device structures closely related to solutions at least according to embodiments of the present disclosure are shown in the drawings, and other details which are not largely related to the present disclosure are omitted.

Figure 2:
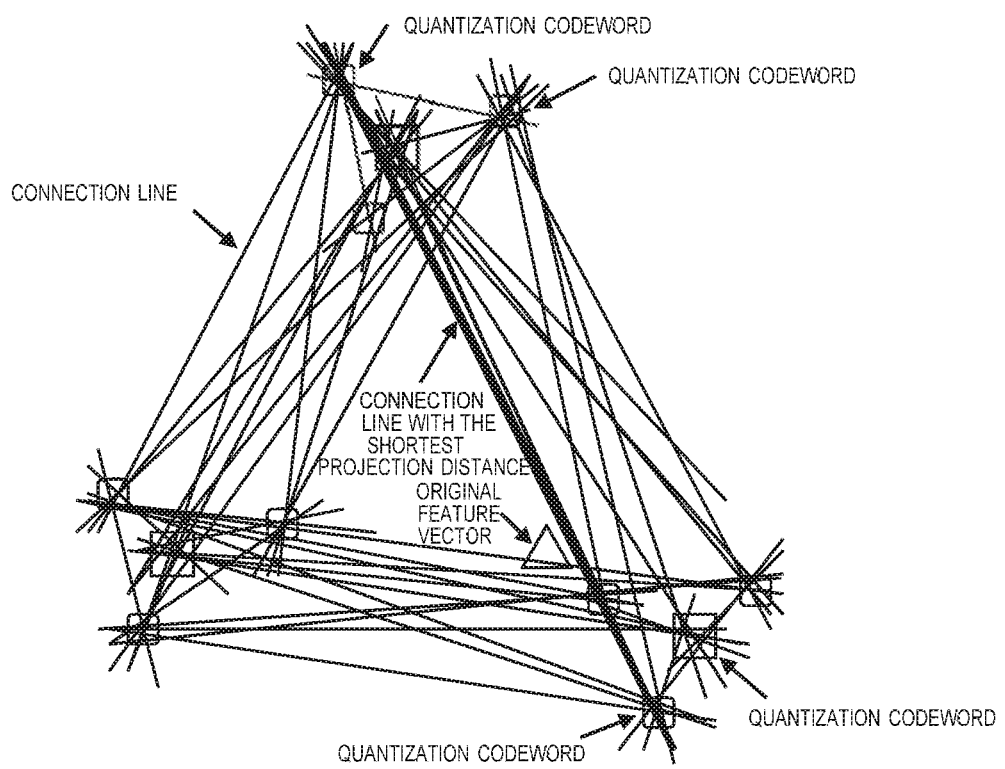
FIG. 2 is a schematic diagram of determining quantization feature vectors in the LQ technique.

FIG. 1 shows a flowchart achieved by a LQ technique, and it can be seen from FIG. 1 that main contents of the LQ technique are as follows: firstly, as shown in FIG. 2, a plurality of quantization codewords are set in a feature space according to a preset Codebook; and then, any two of the set quantization codewords are connected, vertical projection (space distance) from the original feature vector to each of connection lines is calculated, and a connection line for which projection distance of the original feature vector satisfies a requirement (the shortest) are determined, as shown in thick solid lines in FIG. 2; next, projection position of the original feature vector on the determined connection line with the shortest projection distance is taken as position of a quantization feature vector corresponding to the original feature vector in the feature space; finally, the quantization feature vector is represented by the quantization codewords at two ends of the connection line with the shortest distance and other parameters, and the quantization process on the original feature vector at this time is completed.

Figure 3A:
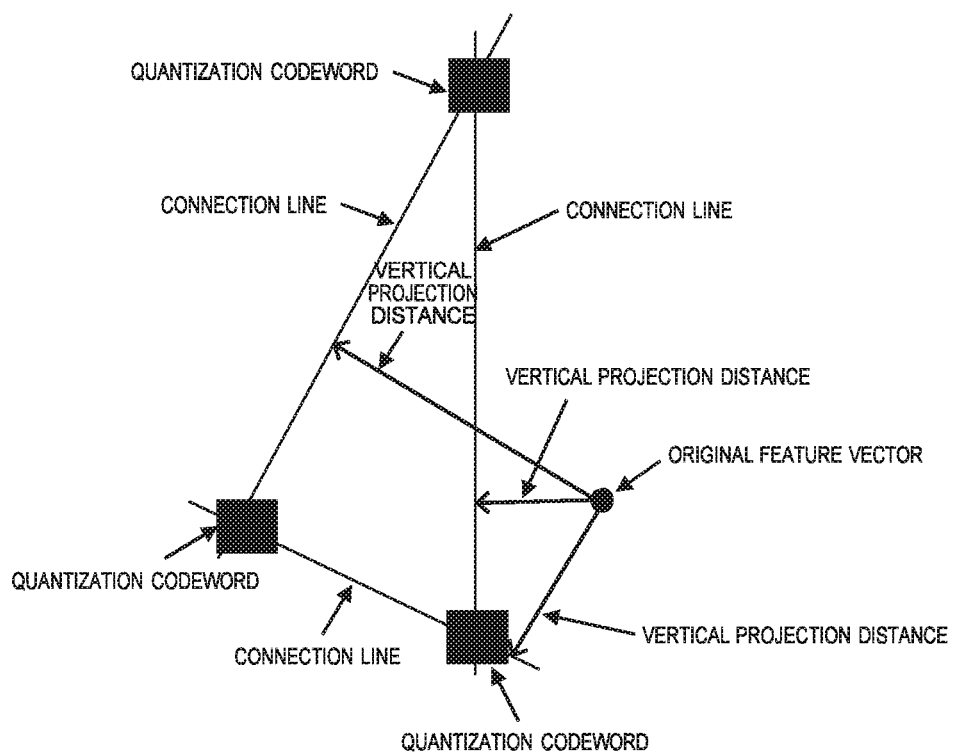
FIG. 3(a) is a schematic diagram of setting three quantization codewords in a feature space.
Figure 3B:
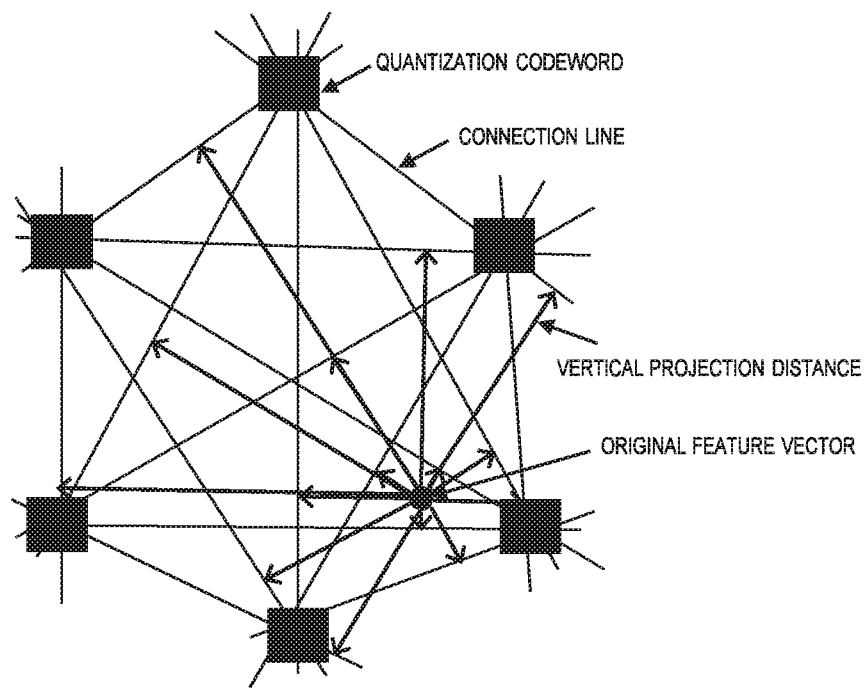
FIG. 3(b) is a schematic diagram of setting six quantization codewords in a feature space.
Figures 4, 5:
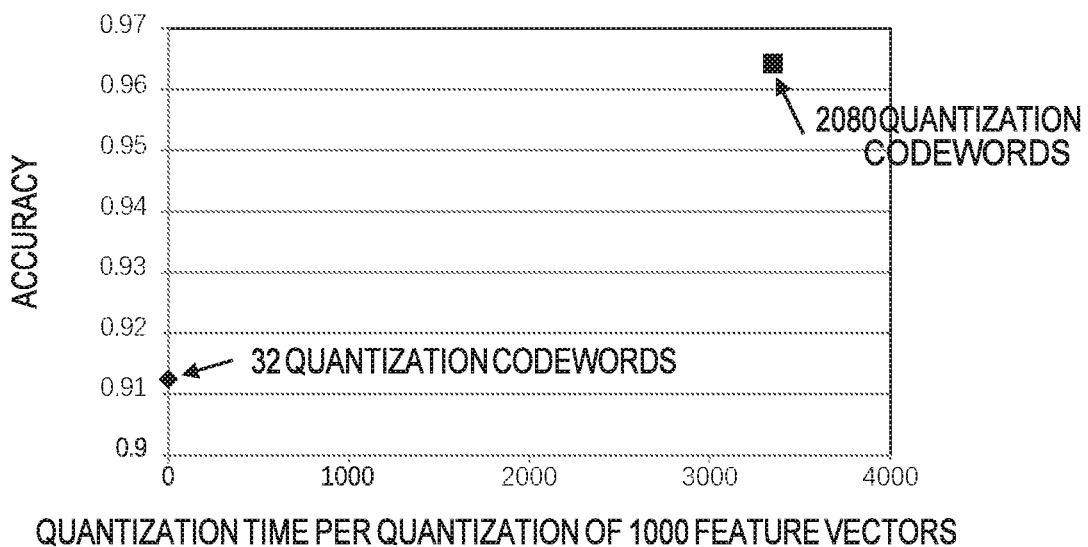
FIG. 4 is a schematic diagram of quantization accuracy when 32 quantization codewords are set and 2080 quantization codewords are set.
FIG. 5 shows quantization errors obtained based on the LQ technique and the method of embodiments of the present disclosure.

In the LQ technique described above, the more the quantization codewords are set in the feature space, the higher the quantization accuracy is. For example, as shown in FIG. 3(a), if three quantization codewords are set in the feature space, there are $C_3^2=3$ of connection lines (three connection lines constituted by any two quantization codewords) by going throughout the three quantization codewords, projection distances of the original feature vector to each of connection lines are calculated respectively, and the connection line with the shortest distance from the original feature vector is determined by calculations of three times. When the number of the quantization codewords set in the feature space increases to 6, as shown in FIG. 3(b), there are $C_6^2=15$ of connection lines (15 connection lines constituted by any two quantization codewords) by going throughout the 6 quantization codewords, and the connection line with the shortest distance from the original feature vector is determined by calculations of fifteen times. As can be seen, the calculation amount of the distances increases much faster as the number of the quantization codewords set in the feature space increases. In fact, in order to guarantee the quantization accuracy, the number of the quantization codewords set in the feature space is far more than 6. As shown in FIG. 4, when 32 quantization codewords are set, computations of $C_{32}^2=496$ times is needed, and the quantization accuracy is 0.91~0.92 at this point by Experimental Verification. When the number of the quantization codewords increases to 2080, the quantization accuracy is significantly improved to 0.96~0.97 by Experimental Verification, but computation number is also dramatically increased to $C_{2080}^2=2,160,160$ times, and the computation time is also increased.

In order to address the issues described above, in some embodiments, for the connection lines constituted by the quantization codewords with distances nearer to the original feature vector, although the distances between them and the original feature vector are not the shortest and the quantization error of the obtained quantization feature vector is also not the smallest, the distances between them and the original feature vector are also not large, and the quantization error of the obtained quantization feature vector is also more close to the smallest quantization error; in view of this, embodiments of the present disclosure include a new quantization method of the feature vectors which determines the quantization feature vector corresponding to the original feature vector by using the connection lines between the quantization codewords (with distance nearer to the original feature vector) within neighborhood range of the original feature vector. By the quantization method of embodiments of the present disclosure, it is only required to calculate distances of the connection lines between the original feature vector and a less number of the quantization codewords, without going throughout the connection lines between all the quantization codewords in the feature space as the LQ technique, and thus the computation amount may be effectively reduced, and the time required for the quantization is shortened.

The left column of FIG. 5 shows the quantization errors (20,000 results) after all the quantization codewords are went throughout by using the LQ technique, wherein the quantization error refers to a projection distance of the original feature vector to the connection line constituted by two quantization codewords; it can be found that several quantization errors of the connection line ranked at the top are very approximate when the quantization errors are sorted from small to large. The right column of FIG. 5 shows that the quantization errors of the quantization feature vectors corresponding to the original feature vectors are determined by using the connection lines between the quantization codewords within neighborhood range of the original feature vector (there are 2,000 results for the quantization codewords within neighborhood range). By comparing the left column with the right column, it can be seen that, in several rows ranked at the top, the difference between the left column and the right column is very small, the smallest quantization error at the right column is equal to the second smallest quantization error at the left column, and the second smallest quantization error at the right column is equal to the third smallest quantization error at the left column. Since the quantization errors at the left column and the right column are very approximate, its negative influence on the accuracy may be neglected; however the computation amount and the computation time of the quantization process can be largely reduced by the method of embodiments of the present disclosure, and it is very helpful for the property improvement of the large-scale search system.

Hereinafter, specific embodiments of the present disclosure will be described in detail with reference to the accompanying drawings of the specification, and it should be understood that the present disclosure is not limited to various exemplary embodiments described below. In addition, in some embodiments, it is unnecessary to include all combinations of features described in the exemplary embodiments.

First Embodiment

Figure 6:
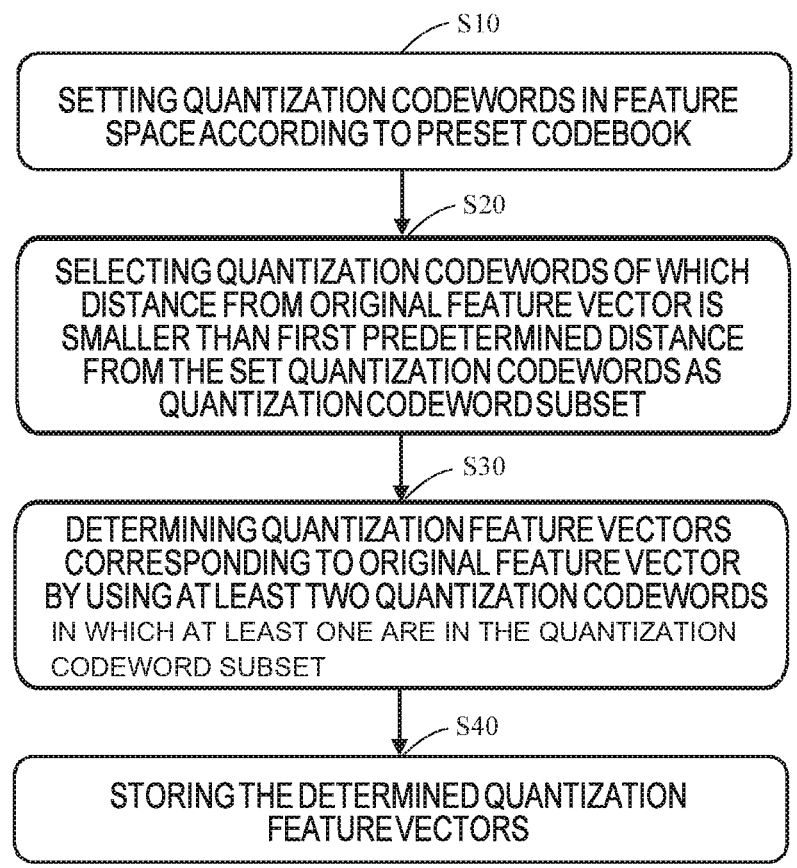
FIG. 6 is a flow schematic diagram of a quantization method of first embodiment of the present disclosure.

The First embodiment describes a method of performing a quantization processing on the original feature vector, and FIG. 6 shows a flow schematic diagram of a quantization method of the first embodiment. The method of the first embodiment will be described below in combination with FIG. 6.

In step S10, quantization codewords are set in the feature space according to the preset codebook.

In the first embodiment, the quantization codewords may be set in a hierarchy structure, or may be set in a non-hierarchy structure (for example a flat structure). Preferably, the quantization codewords are set in the hierarchy structure in order to reduce the computation amount. One optional hierarchy structure of two layers is a structure of a top layer quantization codewords and sub layer quantization codewords corresponding to the top layer quantization codewords, in which the coordinate of each of quantization codewords and the corresponding relationship between the top layer quantization codewords and sub layer quantization codewords are previously recorded in the codebook, and in the step S10, position of each quantization codeword in the feature space may be directly determined according to the codebook. Preferably, the top layer quantization codewords are uniformly set in the feature space.

The advantages of setting quantization codewords in the hierarchy structure are as follows: assuming that 32 top layer quantization codewords are preset in the codebook and 64 sub layer quantization codewords are correspondingly set for each of top layer quantization codewords, a top layer quantization codeword with the shortest distance from the original feature vector can be found from all the quantization codewords and a sub layer quantization codeword with the shortest distance from the original feature vector can be found in this top layer quantization codeword after computations of 96 (32+64=96) times. However, if a general flat structure rather than the hierarchy structure is used, it is required for computations of 2048 (32*64=2048) times to find the quantization codeword closest to the original feature vector.

The subsequent descriptions of embodiments of the present disclosure are explained by taking the hierarchy structure of two layers of the top layer quantization codewords and the corresponding sub layer quantization codewords as example, however the present disclosure is not limited to the above hierarchy structure of two layers, and for example, quantization codeword hierarchy structure with three-layer correlation relationship may also be used in embodiments of the present disclosure. In addition, the codebook involved in some embodiments of the present disclosure is not different from the codebook known in the art, and the preset manner for the codebook is not defined in embodiments of the present disclosure. Dimension of the feature space involved in the present disclosure may be any dimension, and the feature space is not defined in embodiments of the present disclosure.

In step S20, quantization codewords of which the distance from the original feature vector is smaller than first predetermined distance are selected from the set quantization codewords as a quantization codeword subset.

In the step S20, quantization codewords in the quantization codeword subset are quantization codewords within the neighborhood range of the original feature vector in the feature space, and in other words, the distance between the quantization codewords in the quantization codeword subset and the original feature vector is a relatively short. Herein, the first predetermined distance may be value preset according to the experience or experiment, or value set according to the accuracy requirement or computation amount. For example, when it is required a relatively high accuracy, the first predetermined distance may be set to be a relatively small value, and when the accuracy requirement is lowered, the first predetermined distance may be set to be a relatively large value; further, for example, in a case where the allowable computation amount is relatively low, the first predetermined distance may be set to be a relatively small value, and when the allowable computation amount is relatively high, the first predetermined distance may be set to be a relatively large value.

The specific implementation process of the step S20 will be described below in detail, and it is not repeated herein.

In step S30, the quantization feature vectors corresponding to the original feature vector are determined by using at least two quantization codewords, wherein at least one quantization codeword from the at least two quantization codewords are in the quantization codeword subset.

In the step S30, the quantization feature vectors corresponding to the original feature vector may be determined by using two or more quantization codewords, and at least one quantization codeword among these quantization codewords is the quantization codeword of which the distance from the original feature vector is smaller than the first predetermined distance, regardless of the number of the quantization codewords actually used; preferably, other quantization codewords may also be quantization codewords of which the distance from the original feature vector is smaller than the first predetermined distance, and certainly, may also be quantization codewords of which the distance from the original feature vector is not smaller than the first predetermined distance. Thus, the projection distance of the original feature vector on the connection lines constituted by two or more quantization codewords may be controlled to be relatively small, so as to ensure the quantization error between the obtained quantization feature vectors and the original feature vector relatively small. In addition, when the quantization feature vectors are determined by adopting a manner of vertical projections on the connection lines, the connection lines for performing the vertical projection are more than one if the number of quantization codewords for determining the quantization feature vectors is more than two, and the corresponding quantization feature vectors are obtained by performing the vertical projection on each of connection lines. Herein, the obtained more than one quantization feature vectors are quantization results obtained by performing quantization on the original feature vector, however one optimum quantization feature vector may be selected from the obtained more than one quantization feature vectors, for example the quantization feature vector on the connection line with the shortest vertical projection distance is selected.

It should be noted that, the quantization feature vectors are determined by an algorithm of the vertical projections of the original feature vector on the connection lines constituted by two or more quantization codewords in embodiments of the present disclosure, however embodiments of the present disclosure do not make a definition on the specific quantization algorithm, and any algorithms may be implemented in the present disclosure as long as they can determine the quantization feature vectors from the quantization codewords in the quantization codeword subset determined by using the solution of embodiments of the present disclosure.

The specific implementation process of the step S30 will be described below in detail, and it is not repeated herein.

In step S40, the determined quantization feature vectors are stored.

By the previous step S10 to step S30, the quantization process for the original feature vector has been completed and the quantization feature vectors corresponding to the original feature vector are obtained; the quantization feature vectors may be stored in a certain structure in the step S40, so as to perform search with the stored quantization feature vectors subsequently. The specific implementation process of the step S40 will be described below in detail, and it is not repeated herein.

It can be known from the above description of the quantization processing of the first embodiment of the present disclosure, the computation amount may be significantly reduced, and the time for the quantization processing is shortened by using the method of the first embodiment.

Next, each of steps shown in FIG. 6 will be described in detail. It should be noted that the following detail descriptions of each step are only example for achieving each step, and the present disclosure is not limited to the following detail descriptions.

1. The Detail Description for the Selection of the Quantization Codeword Subset of Step S20

Figure 7:
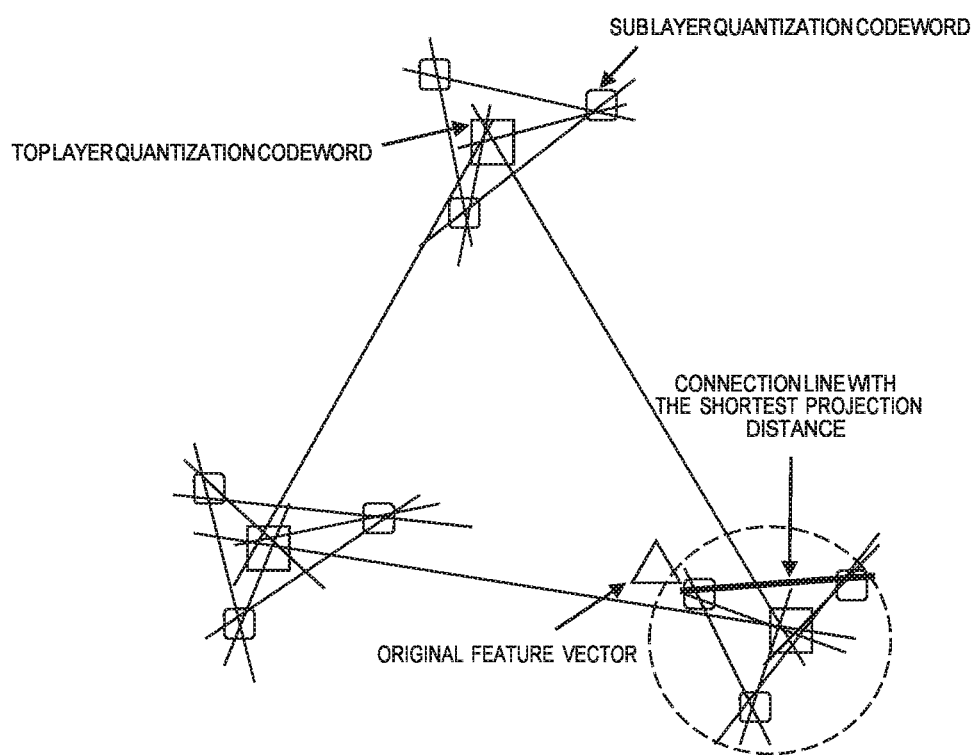
FIG. 7 is a schematic diagram of a quantization codeword subset.

The quantization codewords set in step S10 include the top layer quantization codewords and the sub layer quantization codewords corresponding thereto, and FIG. 7 shows positions of the original feature vector and the quantization codewords set according to the codebook in the feature space, wherein the triangle indicates the original feature vector, there are three top layer quantization codewords (indicated by the relatively large square) in the set twelve quantization codewords, and each of top layer quantization codewords corresponds to three sub layer quantization codewords (indicated by the relatively small square). Please be noted, for the purpose of easy understand, the twelve quantization codewords are set in a relatively small number in FIG. 7, and in practical, the number of the quantization codewords set in the feature space may be far more than 12.

Figure 10:
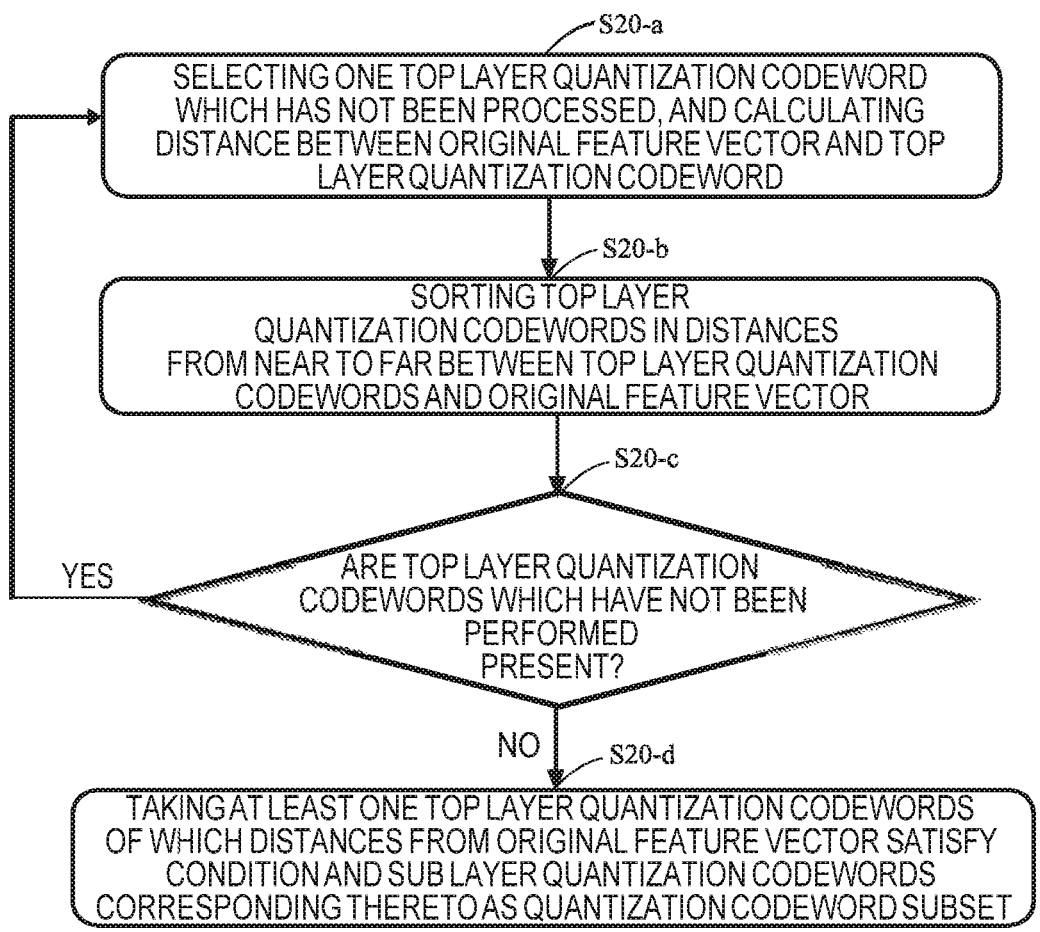
FIG. 10 is a flow schematic diagram of selecting a quantization codeword subset.

In the step S20, quantization codewords of which the distance from the original feature vector is smaller than the first predetermined distance can be selected on basis of the quantization codewords set in step S10. As an adoptable manner, quantization codewords are selected by taking distances between the top layer quantization codewords and the original feature vector as a criterion, and the detail implementation process may be referred to FIG. 10. The detail descriptions are as follows.

S20-*a*: selecting one top layer quantization codeword which has not been processed, and calculating the distance between the original feature vector and the top layer quantization codeword.

Since the distance between a top layer quantization codeword and a sub layer quantization codeword corresponding thereto is relatively small, a top layer quantization codeword of which the distance from the original feature vector is relatively small can be found by calculating the distances between the original feature vector and the top layer quantization codewords, and thus sub layer quantization codewords corresponding to the top layer quantization codeword may be regarded as quantization codewords with the relatively small distance from the original feature vector without calculating the distance between the original feature and each of quantization codewords.

S20-*b*: sorting, based on the calculated distances, the top layer quantization codewords in accordance with distances from near to far between the top layer quantization codewords and the original feature vector.

S20-*c*: judging whether the top layer quantization codewords which have not been performed at the step S20-*a* are present, and if yes, returning to the step S20-*a*, otherwise performing step S20-*d*.

Step S20-*d*: determining at least one top layer quantization codewords of which the distances from the original feature vector satisfy the setting distance requirement, and taking the top layer quantization codewords and sub layer quantization codewords corresponding thereto as a quantization codeword subset.

Figure 8:
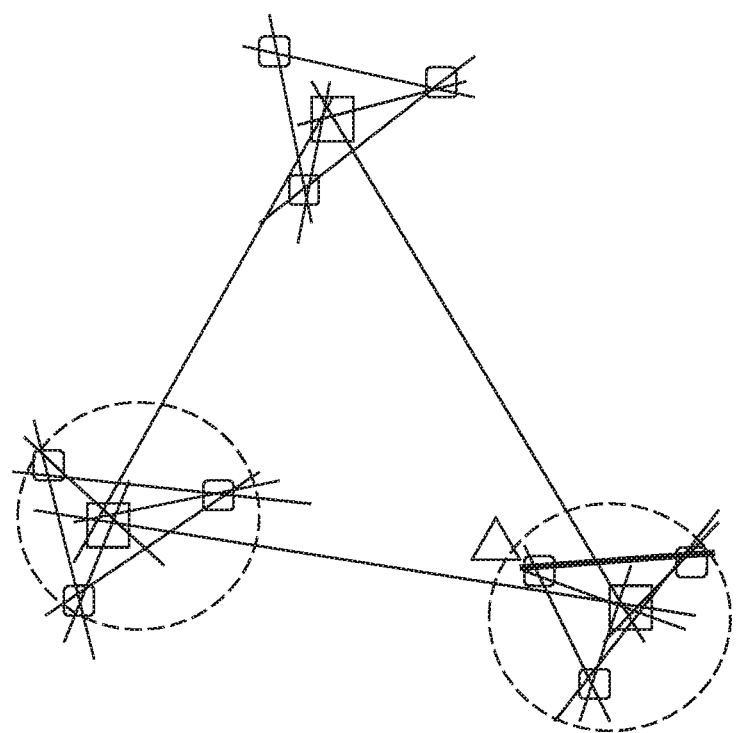
FIG. 8 is a schematic diagram of a quantization codeword subset.
Figure 9:
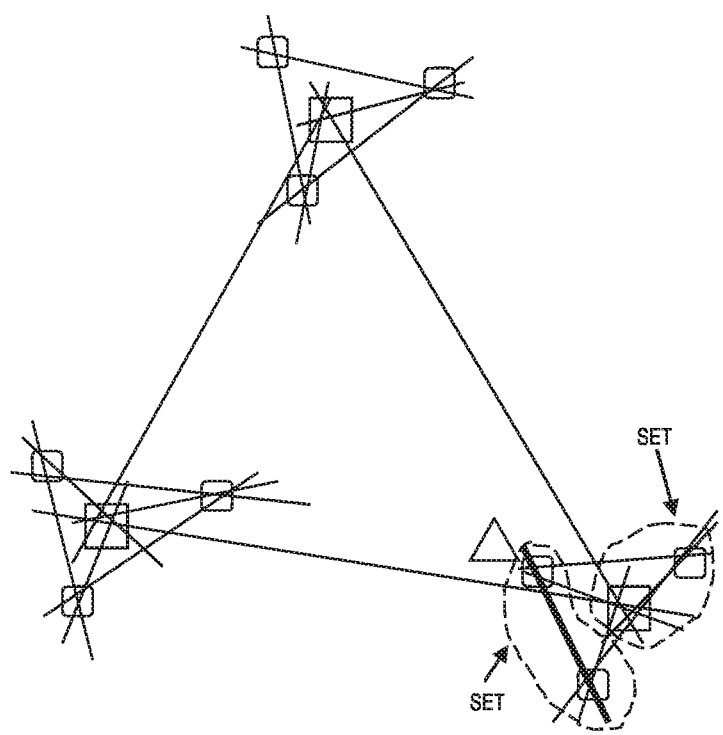
FIG. 9 is a schematic diagram of a quantization codeword subset.

In the step S20-*d*, one top layer quantization codeword with the shortest distance from the original feature vector and sub layer quantization codewords corresponding thereto are taken as the quantization codeword subset, as referred to FIG. 7, wherein the quantization codewords surrounded by the dotted line are the quantization codeword subset; alternatively, a plurality of top layer quantization codewords with the shortest distance from the original feature vector and the sub layer quantization codewords corresponding to each of top layer quantization codewords are taken as the quantization codeword subset, and FIG. 8 illustrates a case where two top layer quantization codewords with the shortest distance and the corresponding sub layer quantization codewords are taken as the quantization codeword subset. In this step, one or more top layer quantization codewords and the corresponding sub layer quantization codewords may be selected as the quantization codeword subset according to the actual demand. Moreover, the selected top layer quantization codewords and the sub layer quantization codewords corresponding thereto may be further refined, that is, the selected quantization codewords (the selected top layer quantization codewords and the sub layer quantization codewords corresponding thereto) are divided into one or more sets, and a part or all of sets are taken as the quantization codeword subset. In FIG. 9, the top layer quantization codeword at lower right and the sub layer quantization codewords corresponding thereto are divided into two sets, and one of the two sets or both of the two sets can be taken as the quantization codeword subset, on the basis of FIG. 7.

The process of the step S20 will be described below by the specific example. Assuming that ID of the original feature vector is Feature 400 which is n dimension vector, there are 32 top layer quantization codewords ID1 to ID32 in the codebook which is preset, and according to the distances of the Feature 400 to each of top layer quantization codewords, it can be assumed that ID2 is a top layer quantization codeword of which the distance from the Feature 400 satisfies the setting distance requirement (for example, it is the shortest). Therefore, the top layer quantization codeword ID2 and the sub layer quantization codewords corresponding to the top layer quantization codeword ID2 may be selected as the quantization codeword subset.

The method shown in step S20-*a* to step S20-*d* is an implementation method of selecting the quantization codeword subset, however the method of selecting the quantization codeword subset of the first embodiment is not limited to this. For example, the distances between the original feature vector and all quantization codewords may be calculated respectively, and several quantization codewords of which the distance from the original feature vector is smaller than the first predetermined distance are selected as the quantization codeword subset.

2. The Detail Description for the Determination of the Quantization Feature Vectors of Step S30

Figure 11:
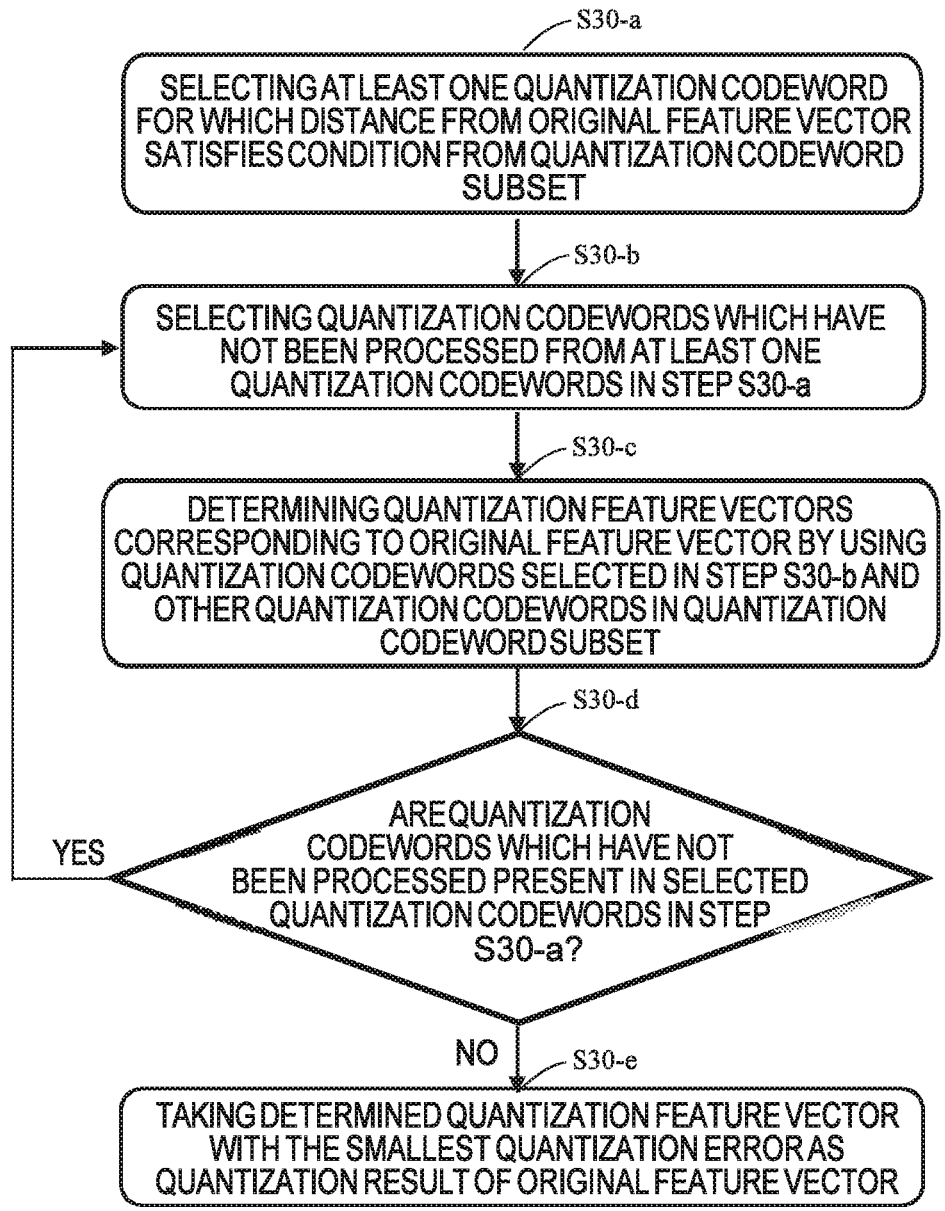
FIG. 11 is a flow schematic diagram of determining quantization feature vectors.

The quantization codewords for determining the quantization feature vectors may be partly from the quantization codeword subset, or may also be completely from the quantization codeword subset. Assuming that the quantization codewords subjected to the quantization processing are completely from the quantization codeword subset, a greedy algorithm may be used to speed the computation. FIG. 11 illustrates a flowchart of the steps for determining the quantization feature vectors based on the greedy algorithm. The detail descriptions for the greedy algorithm are as follows.

Step S30-*a*: sorting the distances between each of quantization codewords in the quantization codeword subset and the original feature vector and selecting at least one quantization codeword for which the distance satisfies a condition.

Herein, at least one quantization codeword with the shortest distance may be selected, and in a case where the allowable degree for the computing resource occupation is relatively high, the more number of the quantization codewords may be selected, and even all quantization codewords in the quantization codeword subset may be selected.

Step S30-*b*: further selecting quantization codewords which have not been processed from the at least one quantization codewords selected in step S30-*a*.

The purpose of the step S30-*b* is to select one quantization codeword for the subsequent steps, and one optional manner is to further randomly select one quantization codeword which has not been processed from the at least one quantization codewords selected in step S30-*a*; preferably, the distances between the at least one quantization codewords selected in step S30-*a* and the original feature vector may also be sorted in advance, and the quantization codewords are selected sequentially in order of distances from small to large in the step S30-*b*.

Step S30-*c*: determining the quantization feature vector corresponding to the original feature vector by using the quantization codewords selected in step S30-*b* and other quantization codewords in the quantization codeword subset.

In the greedy algorithm here, it is described with an example of performing the quantization processing on the original feature vector by two quantization codewords, and when the quantization processing is performed by adopting other algorithm, the number of the quantization codewords used for performing the quantization processing is not limited to two or more.

Step S30-*d*: judging whether quantization codewords which have not been processed are still present in the quantization codewords selected in the step S30-*a*, and if yes, skipping to step S30-*b*, otherwise performing step S30-*e*.

Figure 12:
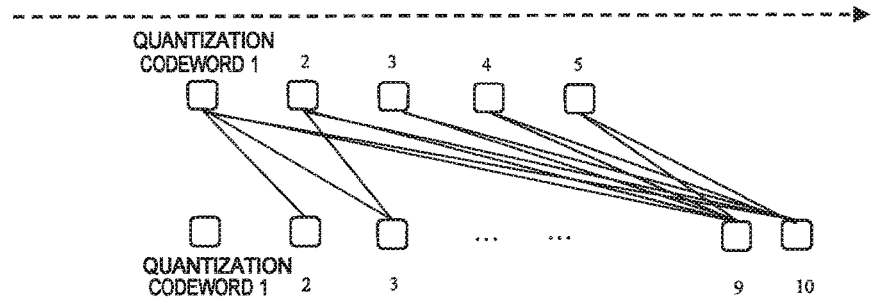
FIG. 12 is a schematic diagram of a quantization processing.

Taking FIG. 12 as example, assuming that there are 10 quantization codewords in the quantization codeword subset, and 5 quantization codewords nearest to the original feature vector are selected in the step S30-*a*. When quantization codeword 1 is selected in the step S30-*b*, in the step S30-*c*, the quantization processing may be performed on the original feature vector by using quantization codeword 1 and quantization codeword 2 to obtain the corresponding quantization feature vector$_{1-2}$, the quantization processing is performed on the original feature vector by using quantization codeword 1 and quantization codeword 3 to obtain the corresponding quantization feature vector$_{1-3}$, and the quantization processing is performed on the original feature vector by using quantization codeword 1 and quantization codeword 4 to obtain the corresponding quantization feature vector$_{1-4}$, respectively; finally, the quantization processing is performed on the original feature vector by using quantization codeword 1 and quantization codeword 10 to obtain the corresponding quantization feature vector$_{1-10}$, in the same manner; by this time, the quantization processing using the quantization codeword 1 has been completed. Then, the quantization codeword 2 is selected in the step S30-$b$, and then in the step S30-$c$, the quantization processing is performed on the original feature vector by using quantization codeword 2 and quantization codeword 3 to obtain the corresponding quantization feature vector$_{2-3}$, and finally, the quantization processing is performed on the original feature vector by using quantization codeword 2 and quantization codeword 10 to obtain the corresponding quantization feature vector$_{2-10}$, in the same manner; by this time, the quantization processing using the quantization codeword 2 has been completed. The above process is repeated, and the step S30-$b$ to the step S30$d$ are finished after the quantization codeword 1 to quantization codeword 5 selected in the step S30-$a$ have been gone throughout.

Preferably, in order to further reduce the computation amount, the maximum of the computation number may be set previously, and in a case where it is required not to exceed the maximum, the processes of the step S30-$b$ to the step S30-$d$ are performed. One optional manner is as follows: in the step S30-$b$, the quantization codewords are selected sequentially in order of distances from the original feature vector from near to far in the step S30-$b$, then in the step S30-$c$, count is performed once, every time the quantization computation is performed once on the original feature vector by using two quantization codewords; when the count value does not exceed the maximum of the computation number, it is to perform the step S30-$c$ and the step S30-$d$ normally, and when the count value exceeds the maximum of the computation number, it is to stop the step S30-$c$ and the step S30-$d$, and directly skip to step S30-$e$.

Step S30-$e$: taking the determined quantization feature vector with the smallest quantization error as the quantization result of the original feature vector, thereby completing the determination process of the quantization feature vector.

The above greedy algorithm of the step S30-$a$ to the step S30-$e$ is one optional implementation manner of determining the quantization feature vectors in the first embodiment, however it should be understood that the first embodiment is not limited to this. For example, the quantization feature vector corresponding to the original feature vector may be determined by selecting any at least two quantization codewords from the quantization codeword subset; alternatively, the quantization feature vector corresponding to the original feature vector is determined by selecting at least two quantization codewords with the shortest distance from the original feature vector from the quantization codeword subset; another alternatively, the quantization feature vector corresponding to the original feature vector is determined by selecting any at least one quantization codewords from the quantization codeword subset and further selecting at least one quantization codewords outside the quantization codeword subset.

The processing how to select the quantization codewords for quantizing the original feature vector has been described above, and next, it will be described that the processing how to calculate the quantization feature vector corresponding to the original feature vector by using the quantization codewords after the quantization codewords for performing the quantization processing on the original feature vector are determined. The method for calculating the quantization feature vector will be described below by respectively taking the cases of using two quantization codewords and three quantization codewords as examples.

Still taking the case of the original feature vector Feature 400 assumed in the description of the step S20 as an example, FIG. 13 ($a$) illustrates an example of calculating the quantization feature vector corresponding to the original feature vector by using the top layer quantization codeword ID2 and the sub layer quantization codeword ID2-1. In the FIG. 13 ($a$), the triangle indicates the position of the original feature vector in the feature space, two squares indicate the positions of the quantization codeword ID2 and the quantization codeword ID2-1 in the feature space, the projection position of the original feature vector on the connection line between the ID2 and the ID2-1 is the quantization feature vector corresponding to the original feature vector and the position of the quantization feature vector in the feature space is indicated in a circular. The coordinates of the ID2, the ID2-1 and the original feature vector in the feature space are known, and in order to easily represent the calculated quantization feature vector with the known coordinates in combination with a geometric computation, the distance from the quantization feature vector to a nearer one of the ID2 and the ID2-1 may be calculated firstly by the formula (1).

$$L = \frac{b^2 + c^2 - a^2}{2c} \quad (1)$$

Wherein L indicates the distance from the quantization feature vector to the ID2 (the quantization codeword of the ID1 and the ID2 which is nearer to the quantization feature vector); a indicates the distance between the ID1 and the original feature vector; b indicates the distance between the ID2 and the original feature vector; and c indicates the distance between the ID2 and the ID2-1. By setting parameters such as a scale factor $$\lambda = \frac{L}{c},$$

the quantization feature vector may be represented by a geometric computation in the parameter (for example $\lambda$), the coordinate of the ID2 and the coordinate of the ID2-1.

FIG. 13 ($b$) illustrates an example of calculating the quantization feature vector corresponding to the original feature vector by using the quantization codeword ID2, the quantization codeword ID2-1 and the quantization codeword ID2-2 (assuming that the ID2-2 is a sub layer quantization codeword with the second shortest distance from the original feature vector in the sub layer quantization codewords corresponding to the ID2). Similar to the case of determining the quantization feature vector by using two quantization codewords, the original feature vector is projected on the connection line between the ID2 and the ID2-2 and the connection line between the ID2-1 and the ID3, respectively (herein the projection on the connection line between the ID2 and the ID2-1 is omitted). Two scale factors $$\lambda_1 = \frac{L_1}{c} \text{ and } \lambda_2 = \frac{L_2}{d}$$

are set, wherein $L_1$ indicates the distance from the quantization feature vector which is obtained by projecting the original feature vector on the connection line between the ID2 and the ID2-2 to ID2-2, c indicates the distance from ID2 to ID2-2, $L_2$ indicates the distance from the quantization feature vector which is obtained by projecting the original feature vector on the connection line between the ID2-1 and the ID2-2 to ID2-1, d indicates the distance from ID2-2 to ID2-1, and e indicates the distance from the original feature vector to ID2-2. As shown in FIG. 13 (b), the quantization feature vector corresponding to the original feature vector may be determined based on a geometric computation by using the ID2, ID2-1, ID2-2, $\lambda_1$ and $\lambda_2$. It should be noted that, in here, the $\lambda_1$ and $\lambda_2$ are used to distinguish $\lambda$ obtained after the original feature vector is projected on the difference connection lines, and there are no direct correlation among $\lambda$.

Figure 13A:
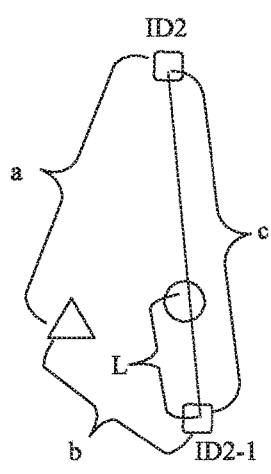
FIG. 13(a) is a schematic diagram of determining quantization feature vectors by using two quantization codewords.
Figure 13B:
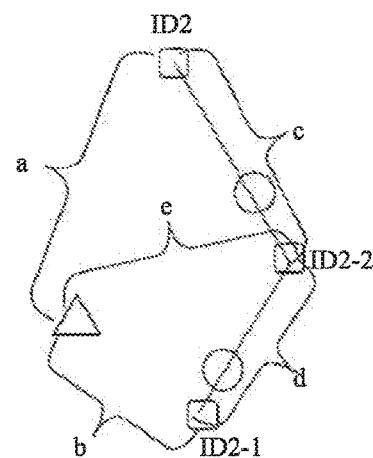
FIG. 13(b) is a schematic diagram of determining quantization feature vectors by using three quantization codewords.

It can be known from the above descriptions of FIG. 13(a) and FIG. 13(b), the quantization feature vector corresponding to the original feature vector may be indicated by information of each of quantization codewords (for example the coordinate information of quantization codeword) and at least one parameters when the quantization processing is performed on the original feature vector by using two or more quantization codewords, wherein the parameters may be $\lambda$ which indicates, in considering of directionality, a ratio of the distance L of the quantization feature vector obtained by vertically projecting the original feature vector on the connection line constituted by two quantization codewords to the nearer one of the two quantization codewords, to the distance c between the two quantization codewords, and the number of the parameters is equal to the number of the connection lines constituted between the quantization codewords used for performing the quantization processing. It should be noted that, the parameters used to represent the quantization feature vector here may be the above $\lambda$, however they may also be parameters to represent the quantization feature vector by other geometric computations; the parameters are not defined herein, as long as they can represent the quantization feature vector by using the information of the quantization codewords and parameter in combination with the geometric computation. The following descriptions are given by taking the above $\lambda$ as an example.

Figure 14:
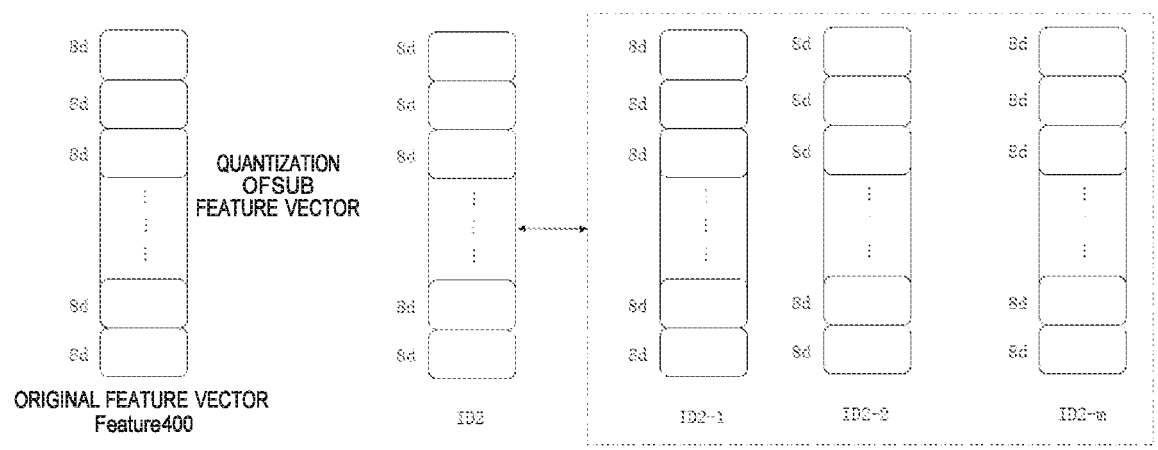
FIG. 14 is a schematic diagram of performing a quantization processing on sub feature vectors.

In a case where the original feature vector is a feature vector with a relatively high dimension, for example Feature 400 is a feature vector of 480d, for the purpose of simplifying computation, the Feature 400 may be regarded as 8d sub feature vectors of 60, and a quantization computation is performed for each 8d sub feature vector. Still taking the case where the ID2 and its sub layer quantization codewords ID2-1 to ID2-m as the quantization codeword subset as an example, as shown in FIG. 14, the quantization processing is performed on the first 8d sub feature vector of the Feature 400, and the process includes: firstly, two quantization codewords (assuming ID2-1 and ID2-5) are determined from the ID2 and ID2-1 to ID2-m, and vertical projection distance of the first 8d sub feature vector of the Feature 400 on the connection line constituted by the first 8d of the two quantization codewords is shortest; and then, according to the method shown in FIG. 13(a), the quantization feature vector corresponding to the first 8d sub feature vector of the Feature 400 is indicated by the ID2-1, ID2-5 and $\lambda_1$. Next, the quantization processing is performed on the second 8d sub feature vector of the Feature 400, and the process includes: firstly, two quantization codewords (assuming ID2-2 and ID2-3) are determined from the ID2 and ID2-1 to ID2-m, and the distance between the second 8d coordinates of the two quantization codewords and the second 8d sub feature vector of the Feature 400 is shortest; and then, according to the method shown in FIG. 13(a), the quantization feature vector corresponding to the second 8d sub feature vector of the Feature 400 is indicated by the ID2-2, ID2-3 and $\lambda_2$. In the same manner, the quantization processing is performed on other fifty-eight 8d sub feature vectors of the Feature 400, and the quantization feature vector corresponding to each 8d sub feature vector is obtained. Please be noted, $\lambda_1$ and $\lambda_2$ in here are used to distinguish $\lambda$ when the quantization processing is performed on the different sub feature vectors and there is no direct correlation among the $\lambda$.

Figure 15A:
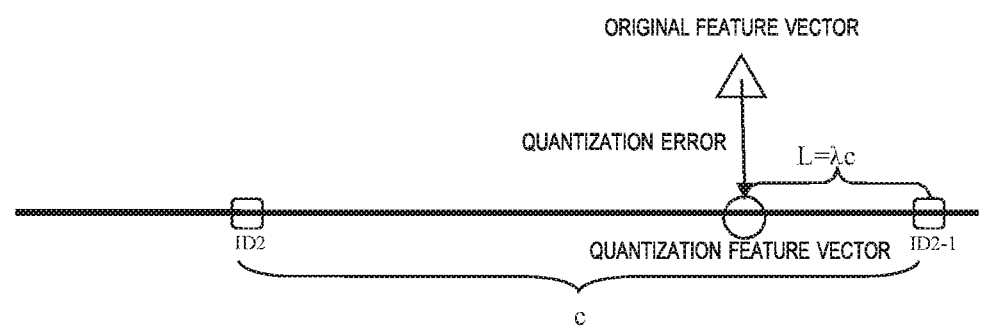
FIG. 15(a) and FIG. 15(b) respectively illustrate two cases where calculation values of $\lambda$ are positive and negative.
Figure 15B:
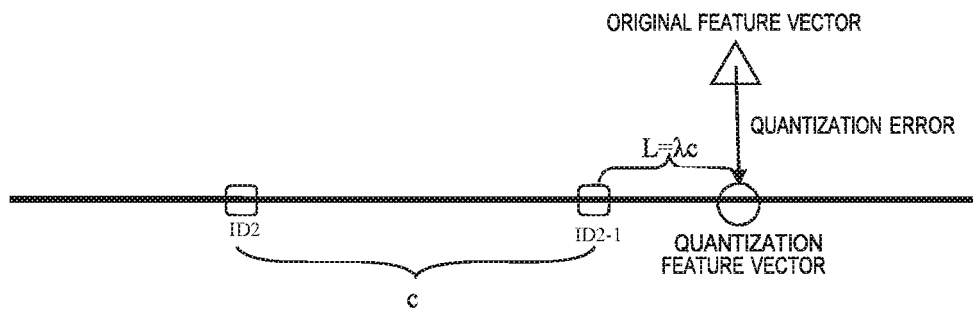

It can be known from the descriptions of FIG. 13(a) and FIG. 13(b), the $\lambda$ may be used to indicate the quantization feature vector corresponding to the original feature vector, and it can be further known from the descriptions of FIG. 14, the $\lambda$ may also be used to indicate the quantization feature vector corresponding to the sub feature vector in the original feature vector. In considering of directionality of $\lambda$, $\lambda$ is larger than 0 and equal to or smaller than 0.5 in the case shown in FIG. 15(a); and $\lambda$ is smaller than 0 in the case shown in FIG. 15(b).

In the actual computation process, the calculation value of $\lambda$ is taken a value within the range of $(-\infty, 0.5]$, and if the calculation value of $\lambda$ is directly stored in a memory every time computation, the storage of calculation value of $\lambda$ will occupy a large number of memory resources. In order to limit the memory resources occupied by $\lambda$, the manner of limiting the number of values of $\lambda$ is generally adopted in the art and its contents are as follows: a certain number of bytes such as 16 bytes is allocated to $\lambda$, thus $\lambda$ may have different 65536 values, and then 65536 values are set for $\lambda$. In fact, the number of the calculation values of $\lambda$ is more than 65536, and when the calculation value of $\lambda$ is not included in the preset 65536 values, a value closest to the calculation value of $\lambda$ may be looked up from the 65536 values and the looked up value is taken as $\lambda$ obtained in this time quantization computation and is stored. Since the finally stored values is the preset 65536 values, the memory resources occupied by $\lambda$ can be limited.

Figure 16A:
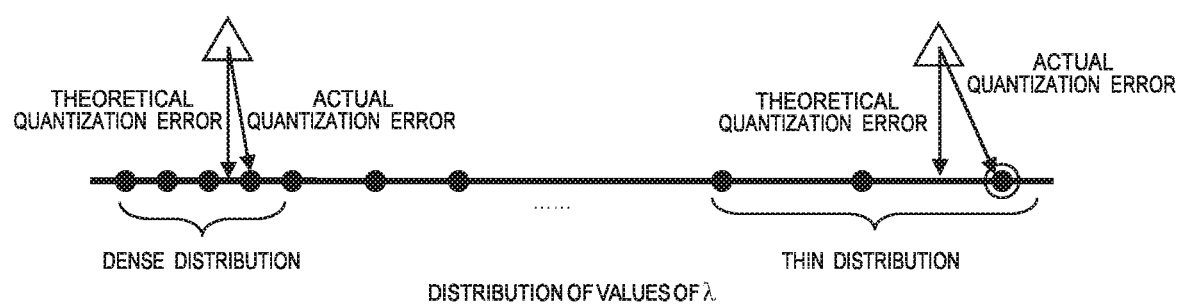
FIG. 16 (a) and FIG. 16 (b) are schematic diagrams of values of $\lambda$ in the feature space.

FIG. 16(a) illustrates an example of values of $\lambda$ in the feature space (for example two-dimension space), and when the original feature vector is projected on the extended line of the connection line between ID1 and ID2 in the vertical projection manner, a value closest to an actual projection position of the original feature vector on the connection line is selected as $\lambda$ of this time quantization processing if the actual projection position is not included in the preset 65536 values of $\lambda$. It can be seen from FIG. 16(a), such method of closely selecting value of $\lambda$ will result in that the actual quantization error is larger than the theoretical quantization error, and particularly in an area where the distribution of values of $\lambda$ is thin, the actual quantization error is larger.

Based on the above method of replacing the calculation value of $\lambda$ with a preset value of $\lambda$, the first embodiment proposes an optimization method in which it is desired to reduce the memory resources occupied by $\lambda$ as much as possible while maintaining the quantization accuracy. The optimization method in the first embodiment will be described below in detail.

Figure 16B:
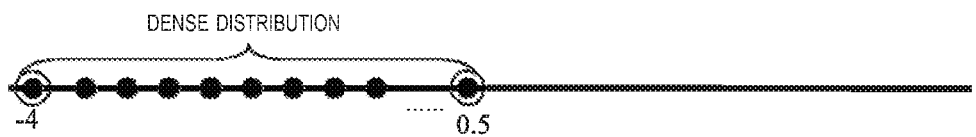

According to some embodiments, the distribution of the values of $\lambda$ will be relatively dense in a certain specific area in the feature space, if the 65536 values (a case of 16 bytes) of $\lambda$ are not set in the whole feature space but set in the specific area. If the calculation value of $\lambda$ falls in the specific area, the quantization error will not be very large even if the calculation value of $\lambda$ is replaced with a value closest to the calculation value; if the set specific area is an area with a high possibility which the calculation value of $\lambda$ falls in, it can be ensured that the quantization accuracy is relatively high on the whole. For example, see FIG. 16 (b), when the feature space is a two-dimension space, the values of $\lambda$ are limited to a specific area of [−4, 0.5], and the distribution of values of $\lambda$ is dense in this specific area. when the calculation value of $\lambda$ falls in this specific area, the actual quantization error is very close to the theoretical quantization error, and the quantization accuracy is high; when the calculation value of $\lambda$ is smaller than −4, $\lambda$ may be taken a value of −4.

Compared with known methods in the art, the method of setting the value of $\lambda$ in the specific area in the feature space in the first embodiment can effectively improve the quantization accuracy. Even if the number of bytes allocated to $\lambda$ is decreased to 8 bytes from 16 bytes and there are 256 values for the pre-settable values of $\lambda$, the 256 values are set in one specific area according to the optimization method of the first embodiment to make the distribution of the values of $\lambda$ in the specific area be dense so as to ensure the quantization accuracy in a case where the number of bytes occupied by $\lambda$ can be decreased.

The above range [−4, 0.5] of the specific area is an example of a specific area set in the two-dimension feature space, however the specific area may be set in more dimension feature space according to the actual requirement, and the selection of the specific area is not limited in the first embodiment, for example, an area with a high possibility which the calculation value of $\lambda$ falls in may be taken as the set specific area according to a manner such as experiment or sampling. Certainly, the value of $\lambda$ set in the specific area may also be a scale factor preset according to the accuracy requirement and so on.

3. The Detail Description for the Storage of the Quantization Feature Vectors of Step S40

After determining the quantization feature vector corresponding to the original feature vector in step S30, the quantization feature vector may be stored in a certain structure, the first embodiment proposes a storage structure shown in FIG. 17 and the storage structure will be described below. It should be noted, the storage structure shown in FIG. 17 is an example which is adaptable structure in the first embodiment, however the first embodiment is not limited to such storage structure, as long as a codebook, parameter for representing the quantization feature vector (information of quantization codewords and $\lambda$) and so on can be completely stored and a subsequent search processing can be performed by using the stored contents.

Figure 17:
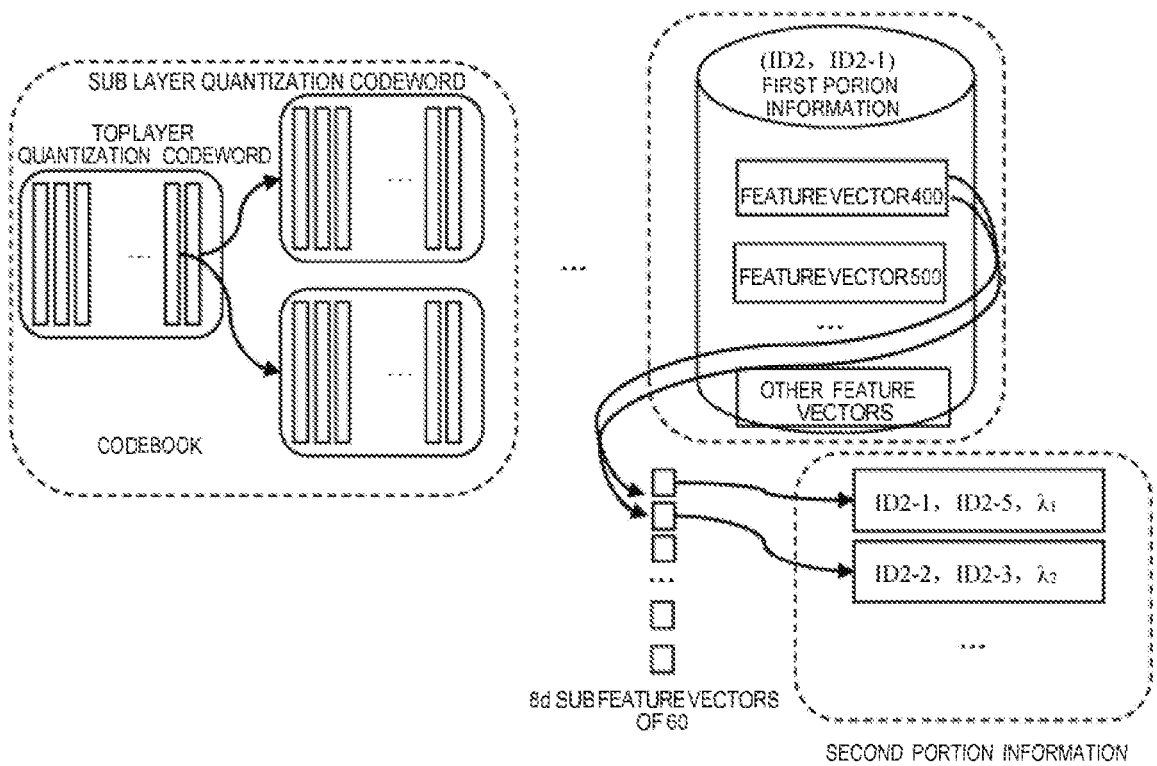
FIG. 17 is a schematic diagram of storage structure of quantization feature vectors.

The codebook and the information for representing the quantization feature vector are stored in the storage structure shown in FIG. 17, wherein the codebook includes information of the top layer quantization codewords and information of the sub layer quantization codewords corresponding thereto (for example coordinates of the quantization codewords and the corresponding relationship between the quantization codewords); the information for representing the quantization feature vector is information of the quantization codewords and $\lambda$. Specifically, the storage structure shown in FIG. 17 stores the following information: codebook, ID of the original feature vector, first portion information and second portion information.

The first portion information is information of two or more quantization codewords for calculating the quantization feature vector corresponding to the original feature vector in a case where the original feature vector is regarded as a whole. By taking a case where a quantization processing is performed on the original feature vector by using two quantization codewords as an example, information of the two quantization codewords constituting the connection line on which the quantization feature vector corresponding to the original feature vector Feature 400 is present may be the first portion information; in addition, for example, if there is a top layer quantization codeword in the quantization codewords used in performing the quantization processing, information of the top layer quantization codeword, and information of, among the sub layer quantization codewords corresponding to the top layer quantization codeword, a sub layer quantization codeword nearest to the original feature vector Feature 400 in distance may be taken as the first portion information; in general, a top layer quantization codeword nearest to the original feature vector Feature 400 in distance will be used as quantization codeword in the quantization processing, and therefore, information of the top layer quantization codeword nearest to the original feature vector Feature 400 in distance and the sub layer quantization codeword nearest to the original feature vector Feature 400 in distance among sub layer quantization codewords of the top layer quantization codeword may be taken as the first portion information. Assuming that the top layer quantization codeword nearest to the original feature vector Feature 400 in distance is ID2, the corresponding sub layer quantization codewords are ID2-1 to ID2-m, and assuming that ID2-1 among the sub layer quantization codewords has the shortest distance from the original feature vector in comparison with other sub layer quantization codewords, and therefore the ID2 and ID2-1 may be taken as the first portion information.

The second portion information is information for representing the two quantization codewords used in performing the quantization processing on each of sub feature vectors and the corresponding $\lambda$ when the original feature vector is regarded as a plurality of sub feature vectors (for example, Feature 400 of 480d is regarded as 8d sub feature vectors of 60). In the quantization processing on the sub feature vectors as shown in FIG. 14, information $\lambda_1$ of two quantization codewords (assuming ID2-1 and ID2-5) used in performing the quantization processing on the first 8d sub feature vector of Feature 400 is the second portion information, and accordingly, two quantization codewords for performing the quantization processing on other 8d sub feature vectors of 59 and the corresponding $\lambda$ are the second portion information.

By the quantization processing on the original feature vector of the first embodiment, the computation amount can be effectively decreased and time required for quantization can be reduced in a case where the relatively high quantization accuracy is ensured, in comparison with the LQ technique.

Second Embodiment

The second embodiment of the present disclosure describes a search method in which, when receiving a feature vector to be looked up input by a user, a result of matching (high similarity) with the feature vector to be looked up may be searched out by performing a feature matching in a database. Herein, the feature vectors stored in the database and used for being indexed are the quantization feature vectors which have been subjected to the quantization processing of the first embodiment, and one or more indexed quantization feature vectors with the shortest distance (highest similarity) are output to the user as search result, by calculating distances between the feature vector to be looked up and the indexed quantization feature vectors in the database. In view of a case where the quantization feature vectors stored in the database and used for being indexed are massive, if the distances between the feature vector to be looked up and each of the indexed quantization feature vectors stored in the database are calculated respectively, the computation amount is obviously giant. With regard to this, the second embodiment, in addition to being able to use the conventional search method, further proposes an optimal search method of which the main contents include: a top layer quantization codeword and sub layer quantization codewords corresponding thereto are taken as mediators, quantization feature vectors obtained by making a top layer quantization codeword with a relatively short distance from the feature vector to be looked up and its sub layer quantization codewords participate in the quantization processing are taken as the indexed quantization feature vectors, and one or more search results with the shortest distance from the feature vector to be looked up are searched out therefrom. The calculation amount can be largely decreased in a case where the search accuracy is ensured by using the optimization method of the second embodiment.

Figure 18:
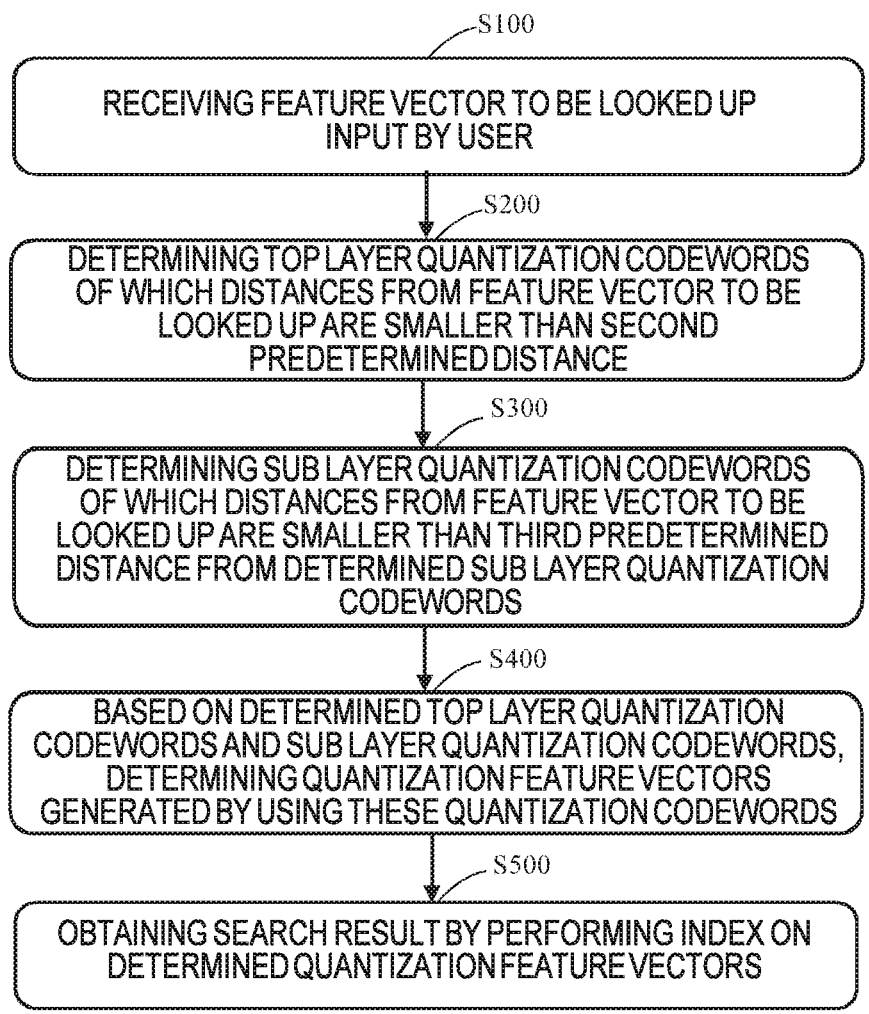
FIG. 18 is a flow schematic diagram of a search method of second embodiment of the present disclosure.

FIG. 18 shows a flowchart of the search method of the second embodiment, and its detail descriptions are as follows.

Step S100: receiving a feature vector to be looked up input by a user.

Step S200: determining top layer quantization codewords of which distances from the feature vector to be looked up are smaller than second predetermined distance according to distances between each of top layer quantization codewords and the feature vector to be looked up.

In the step S200, at least one top layer quantization codewords of which distances from the feature vector to be looked up are smaller than the second predetermined distance (that is, nearer to the feature vector to be looked up in distance) are determined by sorting top layer quantization codewords in order of distances from the feature vector to be looked up from near to far, using the coordinate information of the top layer quantization codewords in the codebook, based on a position of the feature vector to be looked up in the feature space. Preferably, at least one top layer quantization codewords nearest to the feature vector to be looked up in distance may be taken as the determining result of the step S200. Assuming top layer quantization codeword 2, top layer quantization codeword 5 and top layer quantization codeword 9 are determined as the top layer quantization codewords of which distances from the feature vector to be looked up are smaller than the second predetermined distance after the processing of the step S200, and the determined three quantization codewords are sequentially arranged in order of distances from the feature vector to be looked up from near to far.

Step S300: determining sub layer quantization codewords of which distances from the feature vector to be looked up are smaller than third predetermined distance from sub layer quantization codewords corresponding to the top layer quantization codewords determined in step S200

Figure 19:
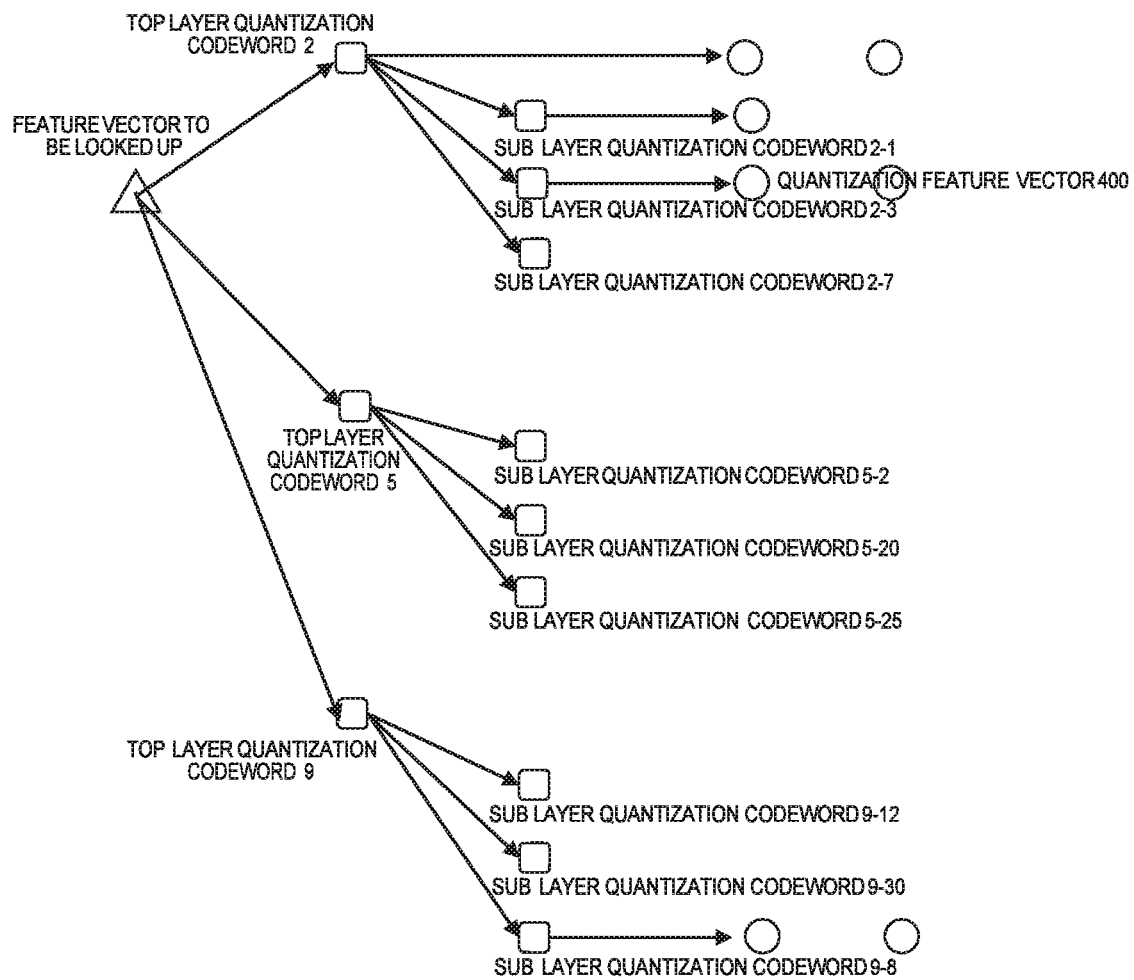
FIG. 19 is a schematic diagram of a relationship between feature vectors to be looked up and quantization codewords in searching.

Taking the top layer quantization codeword 2 in FIG. 19 as an example, firstly all sub layer quantization codewords corresponding to the top layer quantization codeword 2 are determined according to the codebook, and then sub layer quantization codewords of which distances from the feature vector to be looked up are smaller than the third predetermined distance are determined from these sub layer quantization codewords; assuming the sub layer quantization codewords of which distances are smaller than the third predetermined distance are sub layer quantization codewords 2-1, 2-3 and 2-7, and the three sub layer quantization codewords are sequentially recorded in a tree structure with the top layer quantization codeword, in order of distances from the feature vector to be looked up from near to far. Further taking the top layer quantization codeword 9 as an example, firstly all sub layer quantization codewords corresponding to the top layer quantization codeword 9 are determined, and then sub layer quantization codewords of which distances from the feature vector to be looked up are smaller than the third predetermined distance are determined therefrom; assuming the sub layer quantization codewords of which distances are smaller than the third predetermined distance are sub layer quantization codewords 9-8, 9-12 and 9-30, and the sub layer quantization codewords 9-12, 9-30 and 9-8 are sequentially recorded in a tree structure with the top layer quantization codeword, in order of distances from the feature vector to be looked up from near to far.

Please note, the "first predetermined distance" for defining distances between quantization codewords and the original feature vector is mentioned in step 20 of the first embodiment, the "second predetermined distance" for defining distances between top layer quantization codewords and the feature vector to be looked up is mentioned in step S200, and the "third predetermined distance" for defining distances between sub layer quantization codewords and the feature vector to be looked up is mentioned in step S300. Herein, there is no necessary correlation among the "first predetermined distance", the "second predetermined distance" and the "third predetermined distance", and the "first", "second" and "third" herein are used to indicate predetermined distances in different steps.

Step S400: based on the top layer quantization codewords determined in step S200 and the sub layer quantization codewords determined in step S300, determining quantization feature vectors generated by using these quantization codewords.

In an example shown in FIG. 19, for each of quantization codewords (top layer quantization codeword or sub layer quantization codeword), quantization feature vectors generated by using the quantization codeword are determined. For example, quantization feature vectors generated by using the sub layer quantization codeword 2-1 include the quantization feature vector 400.

Since the top layer quantization codewords determined in step S200 and the sub layer quantization codewords determined in step S300 are quantization codewords relatively near to the feature vector to be looked up in distance, distances between the quantization feature vectors generated by using these quantization codewords and stored in the database and the feature vector to be looked up generally are not too far. Therefore, if the quantization feature vectors determined in the step S400 are taken as the indexed quantization feature vectors, the computation amount in search can be largely decreased in a case where the search accuracy is ensured.

Step S500: obtaining a search result by performing an index on the quantization feature vectors determined in the step S400.

In the step S500, distances between the quantization feature vectors determined in FIG. 19 and the feature vector to be looked up may be calculated sequentially, so as to search out at least one quantization feature vectors nearest to the feature vector to be looked up in distance as the search result. As a preferred solution, in order to further decrease the calculation amount and improve the search accuracy, index number may be set previously and a counter is automatically added by 1 after distance between one quantization feature vector and the feature vector to be looked up is calculated each time until the calculation number reaches the index number, and the calculated at least one quantization feature vectors nearest to the feature vector to be looked up in distance are taken as the search result.

The search method of the second embodiment is described below based on the storage structure shown in FIG. 17. As shown in FIG. 17, assuming there are two original feature vectors Feature 400 and Feature 500 under the quantization codewords ID2 and ID2-1, that is, the ID2 is the top layer quantization codeword nearest to the two original feature vectors in distance, and the sub layer quantization codeword ID2-1 is the sub layer quantization codeword nearest to the two original feature vectors in distance. Both of the Feature 400 and Feature 500 are 480d feature vector, and can be regarded as 8d sub feature vectors of 60, and the quantization feature vector corresponding to each of sub feature vectors is represented by quantization codewords and λ. When a feature vector to be looked up Feature 600 input by a user is received, it is assumed that the top layer quantization codeword of which distance from the feature vector to be looked up Feature 600 is smaller than the second predetermined distance and which is determined in step S200 is ID2, and the sub layer quantization codeword of which distance from the feature vector to be looked up Feature 600 is smaller than the third predetermined distance and which is determined in step S300 is ID2-1. It can be known by looking up the storage structure shown in FIG. 17, there are two feature vectors Feature 400 and Feature 500 under the quantization codewords ID2 and ID2-1, and the two feature vectors may be directly output to the user as a search end. Certainly, in order to further improve the search accuracy, an index may be performed on the two feature vectors to determine an optimum search result.

In order to determine the optimum search result in the feature vectors Feature 400 and Feature 500, the distances of the Feature 400 and Feature 500 from the feature vector to be looked up Feature 600 can be respectively calculated (the shorter the distance is, the higher the similarity is). One optional calculation method is as follows: the feature vector to be looked up Feature 600 is regarded as 8d sub feature vectors of 60, distances between each of the sub feature vectors and respective sub feature vector of the Feature 400 are added, and distances between each of sub feature vectors of the Feature 600 and respective sub feature vector of the Feature 500 are added, so as to determine the distance between the feature vector to be looked up Feature 600 and the Feature 400 and the distance between the feature vector to be looked up Feature 600 and the Feature 500 and take the original feature vector with the shortest distance as the search result.

Figure 20:
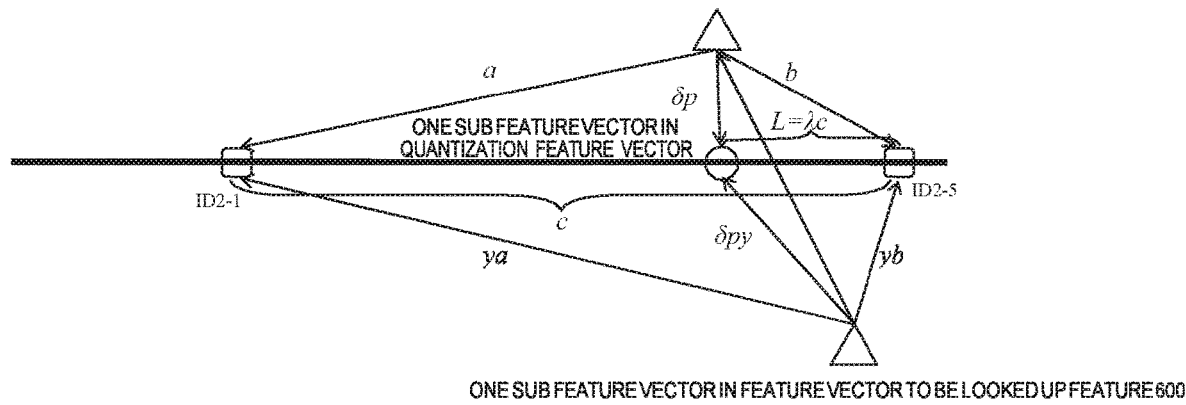
FIG. 20 is a geometry view of calculating distances between quantization feature vectors and feature vectors to be looked up.

FIG. 20 shows a geometry view of distance between one sub feature vector in the quantization feature vector corresponding to the Feature 400 and one sub feature vector in the feature vector to be looked up Feature 600. It is assumed that the distance between one sub feature vector in the quantization feature vector corresponding to the Feature 400 and the corresponding sub feature vector in the Feature 400 is relatively small and may be ignored, a sum of distance $|\delta py|^2$ between one sub feature vector in the feature vector to be looked up Feature 600 and the corresponding sub feature vector in the quantization feature vector corresponding to the Feature 400 and distance $|\delta p|^2$ between one sub feature vector in the quantization feature vector corresponding to the Feature 400 and the corresponding sub feature vector in the Feature 400 is approximately equal to distance between one sub feature vector in the feature vector to be looked up Feature 600 and the corresponding sub feature vector in the Feature 400, which corresponds to the following formula (2).

$$\sum_{p=1}^{QP}(|XY|^2) \approx \sum_{p=1}^{QP}(|\delta py|^2 + |\delta p|^2) \approx \sum_{p=1}^{QP}(|\delta py|^2) \qquad (2)$$

Wherein, $$\sum_{p=1}^{QP}(|XY|^2)$$

is a sum of distances between the feature vector to be looked up Feature 600 and each of sub feature vectors of the Feature 400;

$$\sum_{p=1}^{QP}(|\delta py|^2 + |\delta p|^2)$$

is a sum or $|\delta py|^2 + |\delta p|^2$ for each of sub feature vectors;

$$\sum_{p=1}^{QP}(|\delta py|^2)$$

is a sum of distances between the feature vector to be looked up Feature 600 and each of sub feature vectors of the quantization feature vector corresponding to the Feature 400.

Furthermore, the distance between one sub feature vector in the feature vector to be looked up Feature 600 and the corresponding sub feature vector of the quantization feature vector corresponding to the Feature 400 is calculated according to the following formula (3).

$$|\delta py|^2 = |yb|^2 + \lambda^{2*}|c|^2 + \lambda^*(|ya|^2 - |yb|^2 - |c|^2) \qquad (3)$$

Wherein, assuming one sub feature vector of the quantization feature vector corresponding to the Feature 400 is represented by the ID2-1, ID2-5 and λ, ya and yb respectively indicate distances from the corresponding sub feature vector of the feature vector to be looked up Feature 600 to the ID2-1 and the ID2-5; and c indicates the distance between the ID2-1 and the ID2-5. The distance between the feature vector to be looked up Feature 600 and the Feature 400 and the distance between the feature vector to be looked up Feature 600 and the Feature 500 can be calculated by the above formula (2) and formula (3), and the original feature vector with the shortest distance is output to the user as the search result.

With the solution of the second embodiment, a set of quantization codewords which are possibly nearer to the feature vector to be looked up in distance is found and a search is completed with a limited index number by taking quantization codewords (top layer quantization codewords and sub layer quantization codewords) which are relatively near to both of the feature vector to be looked up and the quantization feature vector in distance as mediators without going throughout all the indexed quantization feature vectors in the database in search, and thus the computation amount is effectively decreased and the search efficiency is improved in a case where the search accuracy is ensured.

Figure 21:
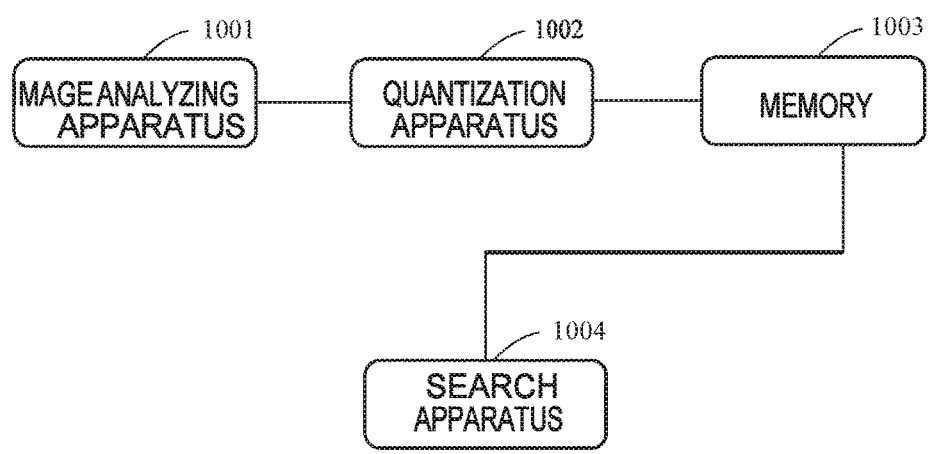
FIG. 21 is a schematic diagram of an image search system.

An image search system of embodiments of the present disclosure is described below with reference to FIG. 21. The image search system includes an image analyzing apparatus 1001, a quantization apparatus 1002, a memory 1003 and a search apparatus 1004. The image analyzing apparatus 1001 is configured to receive a human body image from an external device (for example a camera) directly or via an internet, and then extract original feature vectors of the human body image. The quantization apparatus 1002 is configured to perform a quantization processing on the original feature vectors extracted by the image analyzing apparatus 1001, for example perform the quantization processing described in the first embodiment, and store quantization feature vectors after the quantization processing to the memory 1003. The search apparatus 1004 is configured to search (for example search in the second embodiment) out, when a quantization feature vector to be looked up is received, quantization feature vectors of which similarity satisfies a requirement from the memory 1003 as a search result to present to a user, so as to complete a search processing for the image.

In addition to the above respective components, the image search system of embodiments of the present disclosure includes components required for system operation such as a power supply part, a processor (CPU), an internet interface, an I/O interface, a bus and so on, and these are not repeatedly described herein.

The quantization apparatus and the search apparatus will be respectively described in detail below.

Third Embodiment

Figure 22:
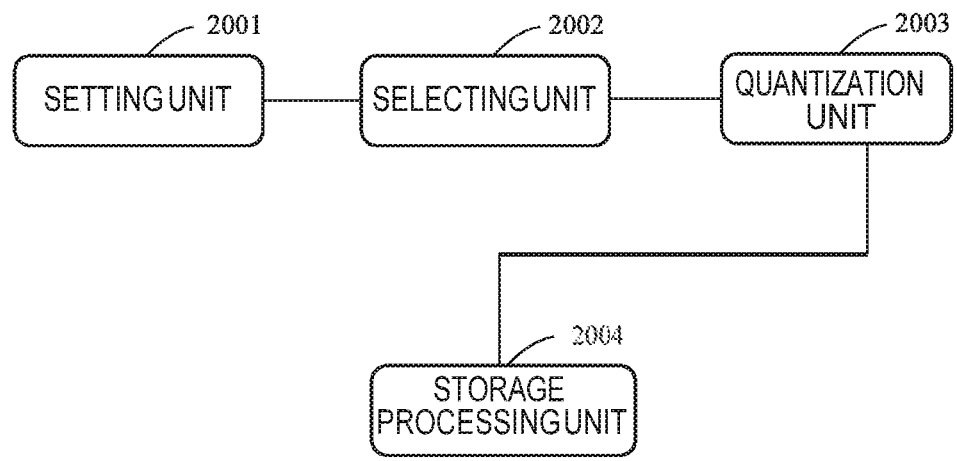
FIG. 22 is a schematic diagram of a quantization apparatus of third embodiment of the present disclosure.

FIG. 22 is a schematic diagram of a quantization apparatus of the third embodiment of the present disclosure. The quantization apparatus includes a setting unit 2001, a selecting unit 2002 and a quantization unit 2003, wherein the setting unit 2001 is configured to set quantization codewords in a feature space according to a preset codebook; the selecting unit 2002 is configured to select a part of quantization codewords from the set quantization codewords as a quantization codeword subset, wherein distances between the quantization codewords in the quantization codeword subset and the original feature vector are smaller than first predetermined distance; the quantization unit 2003 is configured to determine quantization feature vectors corresponding to the original feature vector by using at least two quantization codewords, wherein the quantization codewords from the quantization codeword subset are present in the at least two quantization codewords.

The setting unit 2001 may execute the processing of setting quantization codewords of step S10 in the first embodiment, the selecting unit 2002 may execute the processing of selecting the quantization codeword subset of step S20 in the first embodiment, and the quantization unit 2003 may execute the quantization processing of step S30 in the first embodiment.

Furthermore, the quantization apparatus may further include a storage processing unit 2004, configured to store the quantization feature vectors obtained after the quantization to the memory 1003 in a certain structure. The storage processing unit 2004 may execute the storage processing of step S40 in the first embodiment, and store the quantization feature vectors to the memory 1003 in a structure as shown in FIG. 17.

Fourth Embodiment

Figure 23:
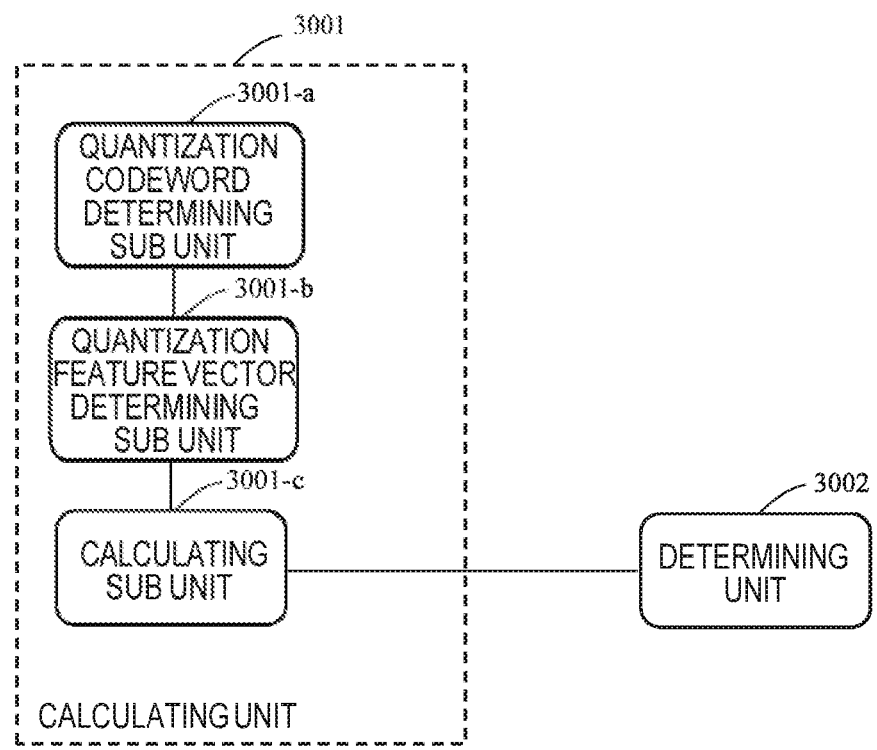
FIG. 23 is a schematic diagram of a search apparatus of fourth embodiment of the present disclosure.

FIG. 23 is a schematic diagram of a structure of a search apparatus of fourth embodiment of the present disclosure. The search apparatus includes a calculating unit 3001 and a determining unit 3002, wherein the calculating unit 3001 is configured to calculate distances between a feature vector to be looked up and quantization feature vectors stored in the database; and the determining unit 3002 is configured to determine at least one quantization feature vectors with the shortest distance as a search result.

Furthermore, the calculating unit 3001 specifically includes: a quantization codeword determining sub unit 3001-$a$, configured to determine a top layer quantization codeword of which distance from the feature vector to be looked up is smaller than second predetermined distance and determine, among sub layer quantization codewords corresponding to the top layer quantization codeword, sub layer quantization codewords of which distances from the feature vector to be looked up are smaller than third predetermined distance; a quantization feature vector determining sub unit 3001-$b$, configured to determine quantization feature vectors obtained by using the top layer quantization codeword or the sub layer quantization codewords determined by the quantization codeword determining sub unit 3001-$a$; and a calculating sub unit 3001-$c$, configured to calculate distances between the feature vector to be looked up and the quantization feature vectors determined by the quantization feature vector determining sub unit 3001-$b$.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiment(s) of the present disclosure can also be realized by a method of providing a software (program) that performs functions of the above embodiments to a system or apparatus through a network or various storage medium, and reading and executing the program by a computer or a central processing unit (CPU), a micro processing unit (MPU) and like of the system or apparatus.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. A quantization method comprising:
setting groups of quantization codewords between which a distance is different depending on a layer;
selecting, from a group of quantization codewords between which a distance is shorter in a layer of layers of the set groups of quantization codewords, at least one quantization codeword of which distance from an original feature vector is smaller than first predetermined distance; and
determining quantization feature vectors corresponding to the original feature vector based on a projection distance of projecting the original feature vector on a line connecting a combination of at least one selected quantization codeword and any other quantization codeword belonging to a layer in which the distance is longer than that in a layer to which the selected quantization codeword belongs,
wherein the quantization feature vectors are expressed using a ratio when the line connecting the two quantization codewords is internally divided or externally divided.

2. The quantization method according to claim 1, wherein quantization codewords set in a hierarchy structure include top layer quantization codewords and sub layer quantization codewords corresponding to the top layer quantization codewords;
the selecting including selecting a quantization codeword subset from the set quantization codewords comprising:
calculating distance of the original feature vector from each of top layer quantization codewords; and
selecting, as the quantization codeword subset, at least one top layer quantization codeword of which distance from the original feature vector satisfies a setting distance requirement and sub layer quantization codewords corresponding to the top layer quantization codeword.

3. The quantization method according to claim 2, wherein at least one top layer quantization codeword of which distance from the original feature vector satisfies the setting distance requirement and the sub layer quantization codewords corresponding to the top layer quantization codeword are divided into sets, and at least one divided set is selected as the quantization codeword subset.

4. The quantization method according to claim 2, wherein the determining quantization feature vectors corresponding to the original feature vector by using at least two quantization codewords comprises:
performing, when a top layer quantization codeword from the quantization codeword subset is present in the quantization codewords for determining the quantization feature vectors corresponding to the original feature vector and when the original feature vector is divided into a plurality of sub feature vectors, a quantization processing on each of the sub feature vectors divided from the original feature vector by using the top layer quantization codeword and the sub layer quantization codewords corresponding thereto.

5. The quantization method according to claim 4, further comprising:
storing the determined quantization feature vectors by the following information:
information of two quantization codewords for determining a quantization feature vector corresponding to the original feature vector, information of two quantization codewords used in performing the quantization processing on each of the sub feature vectors and parameters.

6. The quantization method according to claim 5, wherein the parameter is, in considering of directionality, a ratio of a distance of the sub feature vector to a nearer quantization codeword of the two quantization codewords used in performing the quantization processing, to a distance between the two quantization codewords.

7. The quantization method according to claim 1, wherein when the number of quantization codewords for determining quantization feature vectors corresponding to the original feature vector is more than two, quantization feature vectors obtained based on any two quantization codewords are determined and one quantization feature vector is selected from the determined quantization feature vectors as a quantization feature vector corresponding to the original feature vector.

8. The quantization method according to claim 1, wherein the determining quantization feature vectors corresponding to the original feature vector by using at least two quantization codewords comprises:
connecting any two quantization codewords in the at least two quantization codewords with one another, and calculating vertical projections of the original feature vector on each of connection lines respectively; and
determining a connection line on which projection distance satisfies a requirement, and determining, as a quantization feature vector corresponding to the original feature vector, a projection of the original feature vector on the connection line on which the projection distance satisfies the requirement.

9. The quantization method according to claim 8, wherein the determined quantization feature vector is represented by information of at least two quantization codewords for determining quantization feature vectors corresponding to the original feature vector and at least one parameter.

10. The quantization method according to claim 9, wherein the parameter is, in considering of directionality, a ratio of a distance of a quantization feature vector obtained by projecting the original feature vector on a connection line constituted by two quantization codewords to a nearer quantization codeword of the two quantization codewords, to a distance between the two quantization codewords, and the number of parameters is equal to the number of connection lines constituted by the at least two quantization codewords.

11. The quantization method according to claim 10, wherein the ratio is a preset value of an area including the quantization feature vectors when the line connecting the two quantization codewords is divided into a plurality of areas.

12. The quantization method according to claim 1, the determining quantization feature vectors corresponding to the original feature vector when at least two quantization codewords for determining quantization feature vectors corresponding to the original feature vector are all from a quantization codeword subset comprising:
   selecting, from the quantization codeword subset, at least one quantization codeword of which distance from the original feature vector satisfies a condition;
   calculating, by connecting each of quantization codewords selected from the quantization codeword subset with other quantization codewords in the quantization codeword subset respectively, vertical projections of the original feature vector on each of connection lines; and
   determining a connection line on which projection distance satisfies a requirement, and determining, as a quantization feature vector corresponding to the original feature vector, a projection of the original feature vector on the connection line on which the projection distance satisfies the requirement.

13. The quantization method according to claim 12, the calculating, by connecting each of quantization codewords selected from the quantization codeword subset with other quantization codewords in the quantization codeword subset respectively, vertical projections of the original feature vector on each of connection lines comprising:
   sequentially connecting, in order of distances of quantization codewords selected from the quantization codeword subset from the original feature vector from near to far, each of quantization codewords with other quantization codewords in the quantization codeword subset respectively; and
   finishing, when calculation number of vertical projections of the original feature vector on connection lines exceeds a set maximum value, calculation of vertical projections of the original feature vector.

14. A search method comprising:
   setting groups of quantization codewords between which a distance is different depending on a layer;
   selecting, from a group of quantization codewords between which a distance is shorter in a layer of layers of the set groups of quantization codewords, at least one quantization codeword of which distance from an original feature vector is smaller than first predetermined distance;
   determining quantization feature vectors corresponding to the original feature vector based on a projection distance of projecting the original feature vector on a line connecting a combination of at least one selected quantization codeword and any other quantization codeword belonging to a layer in which the distance is longer than that in a layer to which the selected quantization codeword belongs;
   storing the quantization feature vectors in a database;
   calculating distances of a feature vector to be looked up from the quantization feature vectors in the database; and
   determining, as a search result, at least one quantization feature vector for which distances satisfy a condition, wherein the quantization feature vectors are expressed using a ratio when the line connecting the two quantization codewords is internally divided or externally divided.

15. The search method according to claim 14, wherein the calculating distances of the feature vector to be looked up from quantization feature vectors comprises:
   determining, among quantization codewords set in a feature space, a top layer quantization codeword of which distance from the feature vector to be looked up is smaller than second predetermined distance, and determining, among sub layer quantization codewords corresponding to the top layer quantization codeword, sub layer quantization codewords of which distances from the feature vector to be looked up are smaller than third predetermined distance;
   determining quantization feature vectors obtained by using the determined top layer quantization codeword and/or the determined sub layer quantization codewords; and
   calculating distances between the feature vector to be looked up and the determined quantization feature vectors.

16. A non-transitory computer-readable storage medium storing instructions for causing a computer to perform a search method when executed by the computer, the search method comprising:
   setting groups of quantization codewords between which a distance is different depending on a layer;
   selecting, from a group of quantization codewords between which a distance is shorter in a layer of layers of the set groups of quantization codewords, at least one quantization codeword of which distance from an original feature vector is smaller than first predetermined distance;
   determining quantization feature vectors corresponding to the original feature vector based on a projection distance of projecting the original feature vector on a line connecting a combination of at least one selected quantization codeword and any other quantization codeword belonging to a layer in which the distance is longer than that in a layer to which the selected quantization codeword belongs;
   storing the quantization feature vectors in a database;
   calculating distances of a feature vector to be looked up from the quantization feature vectors in the database; and
   determining, as a search result, at least one quantization feature vector for which distances satisfy a condition, wherein the quantization feature vectors are expressed using a ratio when the line connecting the two quantization codewords is internally divided or externally divided.

17. A quantization apparatus comprising:
   one or more processors programmed to cause the quantization apparatus to function as:
   a setting unit configured to set groups of quantization codewords between which a distance is different depending on a layer;
   a selecting unit configured to select, from a group of quantization codewords between which a distance is shorter in a layer of layers of the set groups of quantization codewords, at least one quantization codeword of which distance from an original feature vector is smaller than first predetermined distance; and a quantization unit configured to determine quantization feature vectors corresponding to the original feature vector based on a projection distance of projecting the original feature vector on a line connecting a combination of at least one selected quantization codeword and any other quantization codeword belonging to a layer in which the distance is longer than that in a layer to which the selected quantization codeword belongs, wherein the quantization feature vectors are expressed using a ratio when the line connecting the two quantization codewords is internally divided or externally divided.

18. A search apparatus comprising:

one or more processors programmed to cause the search apparatus to function as:

a setting unit configured to set groups of quantization codewords between which a distance is different depending on a layer;

a selecting unit configured to select, from a group of quantization codewords between which a distance is shorter in a layer of layers of the set groups of quantization codewords, at least one quantization codeword of which distance from an original feature vector is smaller than first predetermined distance;

a quantization unit configured to determine quantization feature vectors corresponding to the original feature vector based on a projection distance of projecting the original feature vector on a line connecting a combination of at least one selected quantization codeword and any other quantization codeword belonging to a layer in which the distance is longer than that in a layer to which the selected quantization codeword belongs;

a storing unit configured to store the quantization feature vectors in a database;

a calculating unit configured to calculate distances of a feature vector to be looked up from the quantization feature vectors in the database; and a determining unit configured to determine, as a search result, at least one quantization feature vector for which distances satisfy a condition, wherein the quantization feature vectors are expressed using a ratio when the line connecting the two quantization codewords is internally divided or externally divided.

19. A non-transitory computer-readable storage medium storing instructions for causing a computer to perform a quantization method when executed by the computer, the quantization method comprising:

setting groups of quantization codewords between which a distance is different depending on a layer;

selecting, from a group of quantization codewords between which a distance is shorter in a layer of layers of the set groups of quantization codewords, at least one quantization codeword of which distance from an original feature vector is smaller than first predetermined distance; and determining quantization feature vectors corresponding to the original feature vector based on a projection distance of projecting the original feature vector on a line connecting a combination of at least one selected quantization codeword and any other quantization codeword belonging to a layer in which the distance is longer than that in a layer to which the selected quantization codeword belongs, wherein the quantization feature vectors are expressed using a ratio when the line connecting the two quantization codewords is internally divided or externally divided.

* * * * *